(12) United States Patent
Mayer

(10) Patent No.: US 12,336,516 B2
(45) Date of Patent: Jun. 24, 2025

(54) PET HYDRATION SYSTEM

(71) Applicant: Green Life LLC, Reno, NV (US)

(72) Inventor: Richard A. Mayer, Reno, NV (US)

(73) Assignee: Green Life LLC, Reno, NV (US)

( * ) Notice: Subject to any disclaimer, the term of this patent is extended or adjusted under 35 U.S.C. 154(b) by 315 days.

(21) Appl. No.: 17/898,713

(22) Filed: Aug. 30, 2022

(65) Prior Publication Data

US 2023/0046845 A1 Feb. 16, 2023

Related U.S. Application Data

(63) Continuation of application No. 17/681,685, filed on Feb. 25, 2022, now Pat. No. 11,457,609, which is a
(Continued)

(51) Int. Cl.
*A01K 7/02* (2006.01)
*B01D 35/02* (2006.01)
(Continued)

(52) U.S. Cl.
CPC ............. *A01K 7/02* (2013.01); *B01D 35/02* (2013.01); *C02F 1/003* (2013.01); *C02F 1/008* (2013.01);
(Continued)

(58) Field of Classification Search
CPC ............ A01K 7/02; A01K 7/00; A01K 7/025; A01K 7/06; A01K 39/02; A01K 39/04; C02F 1/003; C02F 1/008; C02F 1/46109; C02F 2001/46157; C02F 2201/006; C02F 2209/30; C02F 2209/42; C02F 2209/44; C02F 1/4618; C02F 1/283; C02F 2209/02; C02F 2303/04; C02F 1/002; C02F 9/00; C02F 1/001; C02F 1/461; C02F 1/46104; C02F 1/68; C02F 2103/20; Y02E 60/36; B01D 27/00; B01D 35/02; B01D 35/027; B01D 35/0273; B01D 35/0276; B01D 36/00; B01D 37/00; B67D 7/76; B67D 7/766

See application file for complete search history.

(56) References Cited

U.S. PATENT DOCUMENTS 1,828,872 A 10/1931 Marsh
5,238,559 A * 8/1993 Nieweg .................. B01J 47/024
  220/372

(Continued)

FOREIGN PATENT DOCUMENTS

AU 2017204150 A1 1/2018
CA 2971299 A1 12/2017
(Continued)

*Primary Examiner* — Joseph W Drodge
(74) *Attorney, Agent, or Firm* — Stephen B. Katsaros; Patent Engineering, LLC

(57) ABSTRACT

Illustrative configurations of a pet hydration system and methods are disclosed. The pet hydration system includes a bowl section configured to temporarily store water therein. In one configuration, a hydrogen-generation assembly is positioned in the bowl section. The hydrogen-generation assembly generates and introduces hydrogen into the water temporarily stored in the bowl section. In other configurations, methods related to pet hydration are also disclosed.

16 Claims, 28 Drawing Sheets

Related U.S. Application Data continuation of application No. 17/402,433, filed on Aug. 13, 2021, now Pat. No. 11,291,183.

(51) Int. Cl.
  *C02F 1/00* (2023.01)
  *C02F 1/46* (2023.01)
  *C02F 1/461* (2023.01)

(52) U.S. Cl.
  CPC .............. *C02F 1/46109* (2013.01); *C02F 2001/46157* (2013.01); *C02F 2201/006* (2013.01); *C02F 2209/30* (2013.01); *C02F 2209/42* (2013.01); *C02F 2209/44* (2013.01)

(56) References Cited

U.S. PATENT DOCUMENTS

| | | | |
|---|---|---|---|
| 5,616,243 A * | 4/1997 | Levy | A23L 2/72 210/473 |
| 5,799,609 A * | 9/1998 | Burns | A01K 7/02 119/74 |
| 5,833,831 A | 11/1998 | Kitajima et al. | |
| 6,337,002 B1 | 1/2002 | Kashimoto | |
| 6,460,483 B1 | 10/2002 | Northrop et al. | |
| 7,146,930 B1 | 12/2006 | Ness | |
| 8,245,665 B2 | 8/2012 | Willett | |
| 10,787,370 B2 | 9/2020 | Mainini et al. | |
| 11,291,183 B1 | 4/2022 | Mayer | |
| 11,337,405 B1 * | 5/2022 | Dinger | A01K 7/025 |
| 11,457,609 B1 * | 10/2022 | Mayer | C02F 1/002 |
| 2003/0164306 A1 | 9/2003 | Senkiw | |
| 2003/0230495 A1 | 12/2003 | Anderson et al. | |
| 2004/0118356 A1 | 6/2004 | Krishnamurthy | |
| 2004/0182326 A1 * | 9/2004 | Polimeni, Jr. | A01K 5/0114 119/51.5 |
| 2005/0109610 A1 | 5/2005 | Namoto et al. | |
| 2007/0277738 A1 | 12/2007 | Dentsbier | |
| 2008/0190374 A1 | 8/2008 | Farris | |
| 2008/0314760 A1 | 12/2008 | Napper et al. | |
| 2010/0122660 A1 | 5/2010 | Willett | |
| 2011/0024361 A1 | 2/2011 | Schwartzel et al. | |
| 2011/0064824 A1 | 3/2011 | Lascoste et al. | |
| 2011/0259273 A1 | 10/2011 | Lipscomb et al. | |
| 2012/0017839 A1 | 1/2012 | Veness et al. | |
| 2012/0216751 A1 | 8/2012 | Rowe | |
| 2013/0019809 A1 | 1/2013 | McCallum et al. | |
| 2013/0095138 A1 | 4/2013 | Norton et al. | |
| 2013/0098298 A1 * | 4/2013 | Manickchan | A01K 5/0291 119/51.5 |
| 2013/0220828 A1 | 8/2013 | Fischlein | |
| 2013/0277231 A1 | 10/2013 | Greenberg | |
| 2015/0107522 A1 | 4/2015 | Lamb | |
| 2016/0029592 A1 * | 2/2016 | Springer | G08C 17/02 119/51.11 |
| 2016/0174522 A1 | 6/2016 | Colica | |
| 2016/0174838 A1 | 6/2016 | Herranen et al. | |
| 2016/0362312 A1 | 12/2016 | Cronce et al. | |
| 2017/0152162 A1 | 6/2017 | Cam et al. | |
| 2017/0362092 A1 | 12/2017 | Mainini et al. | |
| 2017/0362103 A1 | 12/2017 | Jung et al. | |
| 2018/0125032 A1 | 5/2018 | Richards | |
| 2018/0338470 A1 * | 11/2018 | Sayers | A01K 7/022 |
| 2019/0119093 A1 * | 4/2019 | Warren | F25D 31/002 |
| 2019/0135661 A1 | 5/2019 | Ellers et al. | |
| 2019/0256386 A1 | 8/2019 | Adams | |
| 2019/0289819 A1 * | 9/2019 | Ranck | A01K 7/025 |
| 2021/0079545 A1 | 3/2021 | Tachibana | |
| 2021/0259200 A1 | 8/2021 | Casarola et al. | |
| 2022/0295742 A1 * | 9/2022 | Pratt | A01K 7/02 |

FOREIGN PATENT DOCUMENTS

| | | | |
|---|---|---|---|
| CN | 108633764 A | 10/2018 | |
| CN | 208159751 U | 11/2018 | |
| CN | 209403276 U | 9/2019 | |
| CN | 210054234 U | 2/2020 | |
| CN | 211268100 U | 8/2020 | |
| CN | 212014053 U | 11/2020 | |
| CN | 213127575 U | 5/2021 | |
| CN | 213127576 U | 5/2021 | |
| EP | 3260422 A1 | 12/2017 | |
| GB | 2458173 A * | 9/2009 | A01K 7/00 |
| IN | 107522326 A | 12/2017 | |
| KR | 2020210000770 U | 4/2021 | |

* cited by examiner

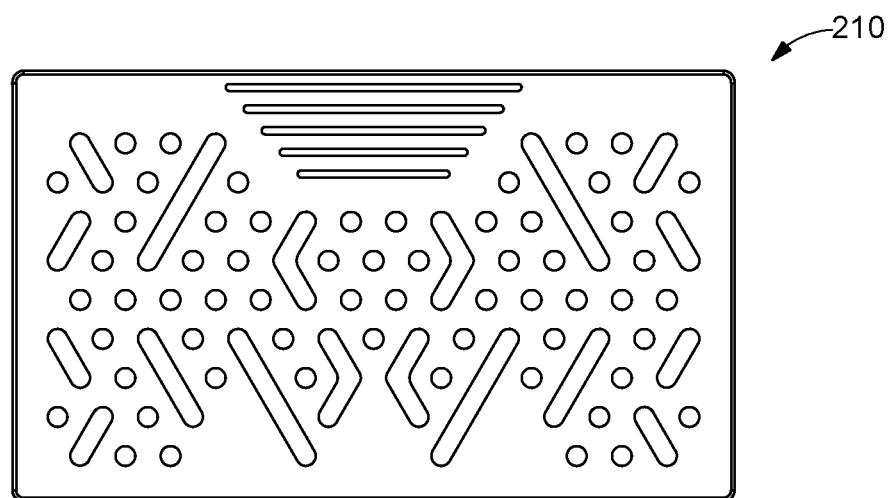
FIG. 37
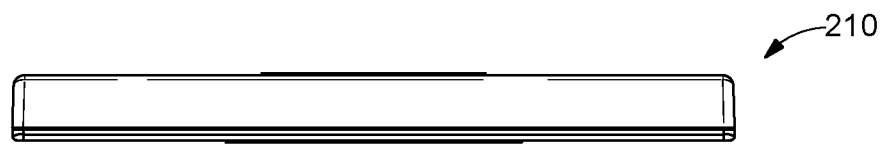
FIG. 38
FIG. 39
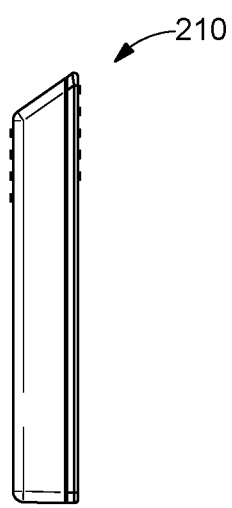 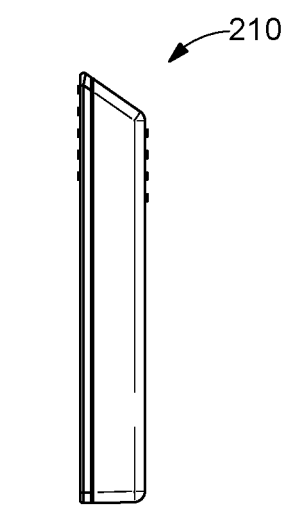 
FIG. 40     FIG. 41     FIG. 42

PET HYDRATION SYSTEM

CROSS REFERENCE TO RELATED APPLICATION

The present application claims priority to U.S. Non-Provisional patent application Ser. No. 17/402,433 entitled "PET HYDRATION SYSTEM", by RICHARD A. MAYER, filed on 13 Aug. 2021 and issued on 5 Apr. 2022, as U.S. Pat. No. 11,291,183 B1. The entirety of the aforementioned application is incorporated herein by reference for all purposes.

The present application is a continuation of U.S. Non-Provisional patent application Ser. No. 17/681,685, entitled "PET HYDRATION SYSTEM", by RICHARD A. MAYER, filed on 25 Feb. 2022. The entirety of the aforementioned application is incorporated herein by reference for all purposes.

A portion of the disclosure of this patent document contains material, which is subject to copyright and/or mask work protection. The copyright and/or mask work owner has no objection to the facsimile reproduction by anyone of the patent document or the patent disclosure, as it appears in the Patent and Trademark Office patent file or records, but otherwise reserves all copyright and/or mask work rights whatsoever.

TECHNICAL FIELD

This disclosure relates in general to pet hydration, and, but not by way of limitation, to a pet hydration system to provide water enriched with hydrogen to pets, a system for managing water supply, and ornamental appearance(s) of a pet hydration system(s).

BACKGROUND

Having pets is a lifestyle choice for many. Pet owners/caretakers prefer to have pets for various reasons, including emotional connection and security. However, having pets bears certain responsibilities, specifically feeding and watering the pets. For example, pets require water to sustain life. To this end, various pet hydration systems may be used. These pet hydration systems provide consumable water in a bowl that is intermittently filled or replenish after the pet has fully-consumed water from the bowl.

SUMMARY

A pet hydration system is disclosed. The pet hydration system provides a consistent supply of water from a replaceable water reservoir which may be mounted on the pet hydration system. The pet hydration system is configured to dynamically supply water from the water reservoir to a bowl section, in response to the water in the bowl section falling below a predefined level upon consumption by the pet. The pet hydration system uses a set of hydrogen-generation assemblies provided in the bowl section which are capable of generating hydrogen gas from the water stored in the bowl section itself. The pet hydration system further includes a removable filter cartridge to filter the water before being supplied to the bowl section. Further, the pet hydration system includes a set of illumination sources which are aligned along a central hole in each of the set of hydrogen-generation assemblies, such that the set of illumination sources emit light via the central holes to accentuate generation of hydrogen by the set of hydrogen-generation assemblies. Furthermore, the pet hydration system includes a Universal Serial Bus (USB) port which provides an interface for supplying electricity to each of the at least one hydrogen-generation assemblies and the set of illumination sources.

In one illustrative configuration, the present disclosure may include a pet hydration system. The pet hydration system may include a tray which may include an upper surface. The tray may further include a bowl section formed on the upper surface of the tray. The bowl section may be configured to temporarily store water. The bowl section may include a base defining an inner surface. The base of the bowl section may include an outer surface oppositely disposed from the upper surface. The bowl section may further include a frustum defining a central axis. The frustum may include a first planar surface transverse to the central axis, a second planar surface transverse to the central axis, a third planar surface transverse to the central axis, and a fourth planar surface transverse to the central axis. The pet hydration system may further include a reservoir section formed in the tray opposite the bowl section. The reservoir section may be configured to receive a water reservoir configured to be removably attached to the reservoir section. The reservoir section may be configured to dynamically supply water from the water reservoir to the bowl section in response to water in the bowl section lowering below a predefined level. The pet hydration system may further include a gravity-fed chute formed in the tray between the reservoir section and the bowl section. The tray may further include a cartridge slot formed along the gravity-fed chute, and a filter cartridge removably positioned in the cartridge slot. The filter cartridge may be configured to filter water flowing from the reservoir section towards the bowl section. The pet hydration system may further include a channel formed in bowl section and directed at the hydrogen-generation assembly. The channel may be configured to guide water emitted from the channel towards the hydrogen-generation assembly. The pet hydration system may further include a set of slots formed in the base of the bowl section. The set of slots may be configured to receive a hydrogen-generation assembly.

In another illustrative configuration, the present disclosure of the pet hydration system may further include a hydrogen-generation assembly positioned at the base of the bowl section. The hydrogen-generation assembly may include a cathode plate. The cathode plate may include a hole formed in the cathode plate. The hydrogen-generation assembly may further include an anode plate formed parallel to and offset from the cathode plate. The anode plate may include a hole formed in the anode plate. The hydrogen-generation assembly may further include a spacer between the cathode plate and the anode plate. The spacer may include a hole formed in the spacer. The holes of the cathode plate, the anode plate, and the spacer may be concentrically aligned to define a light path. The hydrogen-generation assembly of the cathode plate, the anode plate, and the spacer may be configured to generate and combine hydrogen into the water in the bowl section. Each of the cathode plate, the anode plate, and the spacer may include a circular perimeter. The pet hydration system may further include a perforated sheet adjacent to the hydrogen-generation assembly. The perforated sheet may be configured to obstruct contacting the hydrogen-generation assembly.

In another illustrative configuration, the present disclosure of the pet hydration system may further include an illumination source coaxial to the holes. The illumination source may be configured to illuminate hydrogen generated by the hydrogen-generation assembly along the light path.

The illumination source may include a blue-color light source configured in a Light Emitting Diode (LED). The illumination source may be positioned on the outer surface of the base of the bowl section.

In another illustrative configuration, the present disclosure of the pet hydration system may further include a circuit board operationally attached to the illumination source. The pet hydration system may further include a red-colored light source formed in the illumination source. The red-colored light source may be configured to emit red spectrum when water is below a predetermined level. The pet hydration system may further include a sound source operationally attached to the circuit board. The sound source may be configured to emit sound when water is below a predetermined level.

In another illustrative configuration, the present disclosure may further include a method of supplying hydrogenated water from a pet hydration system. The method may include providing the pet hydration system which may include a tray. The tray may include a bowl section configured to temporarily store water. The bowl section may include a hydrogen-generation assembly positioned at a base of the bowl section. The hydrogen-generation assembly may be configured to generate and combine hydrogen into the water in the bowl section. Providing the hydrogen-generation assembly may include providing a cathode plate, an anode plate parallel to and offset from the cathode plate, and a spacer between the cathode plate and the anode plate. The cathode plate, the anode plate, and the spacer may be stacked. The assembly of the cathode plate, the anode plate, and the spacer may be configured to generate and introduce hydrogen into the water temporarily stored in the bowl section. Upon turning ON the hydrogen-generation assembly, a voltage differential may be created between the anode plate and the cathode plate. The bowl section may selectively contain at least a filled volume of water in the bowl section, or a depleted volume of water that is less than the filled volume of water in the bowl section. The pet hydration system may further include a water reservoir controllingly and fluidically coupled to the bowl section.

In another illustrative configuration, the present disclosure of the method of supplying hydrogenated water from a pet hydration system may further include turning ON the hydrogen-generation assembly. The hydrogen-generation assembly may be turned ON based on upon lapsing of the predetermined downtime after turning OFF the hydrogen-generation assembly, or upon detecting a level of hydrogen concentration in the water in the bowl section being below a threshold hydrogen concentration value.

In another illustrative configuration, the present disclosure of the method of supplying hydrogenated water from a pet hydration system may further include providing an illumination source configured to emit light via a light path to accentuate generation of hydrogen the hydrogen-generation assembly.

In another illustrative configuration, the present disclosure of the method of supplying hydrogenated water from a pet hydration system may further include monitoring for the depleted volume of the bowl section. The depleted volume may be indicative of the volume of water in the bowl section falling below the filled volume of water. The method may further include, upon detecting the depleted volume, turning OFF the hydrogen-generation assembly and turning ON a sound source and turning ON a red-color Light Emitting Diode (LED). The method may further include, upon turning ON the hydrogen-generation assembly, turning ON the illumination source to illuminate bubbles formed in the water in the bowl section during hydrogen generation.

In another illustrative configuration, the present disclosure of the method of supplying hydrogenated water from a pet hydration system may further include, upon detecting the filled volume of water in the bowl section, turning ON the hydrogen-generation assembly. The method may further include, during a predetermined runtime, generating and combining hydrogen into the water in the bowl section. The method may further include, upon expiration of the predetermined runtime, turning OFF the hydrogen-generation assembly. The hydrogen-generation assembly may be turned OFF, based on occurrence of lapsing of the predetermined runtime after turning ON of the hydrogen-generation assembly, or detecting the depleted volume of water in the bowl section, or detecting a level of hydrogen concentration in the water in the bowl section being equal to a threshold hydrogen concentration value.

In another illustrative configuration, the present disclosure of the method of supplying hydrogenated water from a pet hydration system may further include, during a predetermined downtime, monitoring for presence of the depleted volume of water in the bowl section. The method may further include, upon expiration of the predetermined downtime and presence of the filled volume of water in the bowl section, turning ON the hydrogen-generation assembly. The method may further include maintaining the filled volume of water in the bowl section. Maintaining the depleted volume of water in the bowl section may include, upon removal of a volume of water from the bowl section and presence of the depleted volume of water, starting to receive water from the water reservoir in the bowl section. Maintaining the depleted volume of water in the bowl section may further include, upon achieving the depleted volume of water in the bowl section, stopping the receiving of water from the water reservoir. Thereby, the method may include supplying hydrogenated water from the pet hydration system.

In another illustrative configuration, the present disclosure may further include a method of hydrogenating water in a pet hydration system. The method may include receiving water in a gravity-fed chute from a reservoir section. The reservoir section and the gravity-fed chute may be defined in a tray of the pet hydration system. The reservoir section may be configured to dynamically supply water to a bowl section defined in the tray, in response to water being removed from the bowl section. The method may further include passing the water through a filter cartridge positioned in the gravity-fed chute. The filter cartridge may be configured to filter the water flowing from the reservoir section towards the bowl section and passing through the filter cartridge. The method may further include receiving filtered water from the gravity-fed chute into the bowl section. The method may further include turning ON each of a set of hydrogen-generation assemblies provided in the bowl section. The method may further include turning OFF each of the set of hydrogen-generation assemblies, based on upon lapsing of a predetermined period of time after turning ON of each of the set of hydrogen-generation assemblies, or upon detecting a level of hydrogen concentration in the water in the bowl section being equal to a threshold hydrogen concentration value, or upon detecting a volume of water in the bowl section falling below a filled volume of water. The reservoir section may be defined towards a second longitudinal end of the tray. The bowl section may be defined towards a first longitudinal end of the tray. The gravity-fed chute may be defined in the tray between the reservoir section and the bowl section. The method may further include turning ON a set of illumination sources to illuminate bubbles formed in the water in the bowl section during hydrogen generation.

Further areas of applicability of the present disclosure will become apparent from the detailed description provided hereinafter. It should be understood that the detailed description and specific examples, while indicating various configuration, are intended for purposes of illustration only and are not intended to necessarily limit the scope of the disclosure.

Further areas of applicability of the present disclosure will become apparent from the detailed description provided hereinafter. It should be understood that the detailed description and specific examples, while indicating various configuration, are intended for purposes of illustration only and are not intended to necessarily limit the scope of the disclosure.

BRIEF DESCRIPTION OF THE DRAWINGS

The accompanying figures of the drawing, which are included to provide a further understanding of general aspects of the system/method, are incorporated in and constitute a part of this specification. These illustrative aspects of the system/method, and together with the detailed description, explain the principles of the system. No attempt is made to show structural details in more detail than is necessary for a fundamental understanding of the system and various ways in which it is practiced. The following figures of the drawing include:

FIGS. 35-42 illustrate views (i.e., a perspective view, a front view, a rear view, a top view, a bottom view, a right side view, a left side view, and a sectional right side view) of an ornamental design of a filter cartridge of the pet hydration system, in accordance with an illustrative configuration of the present disclosure;

Figure 1:
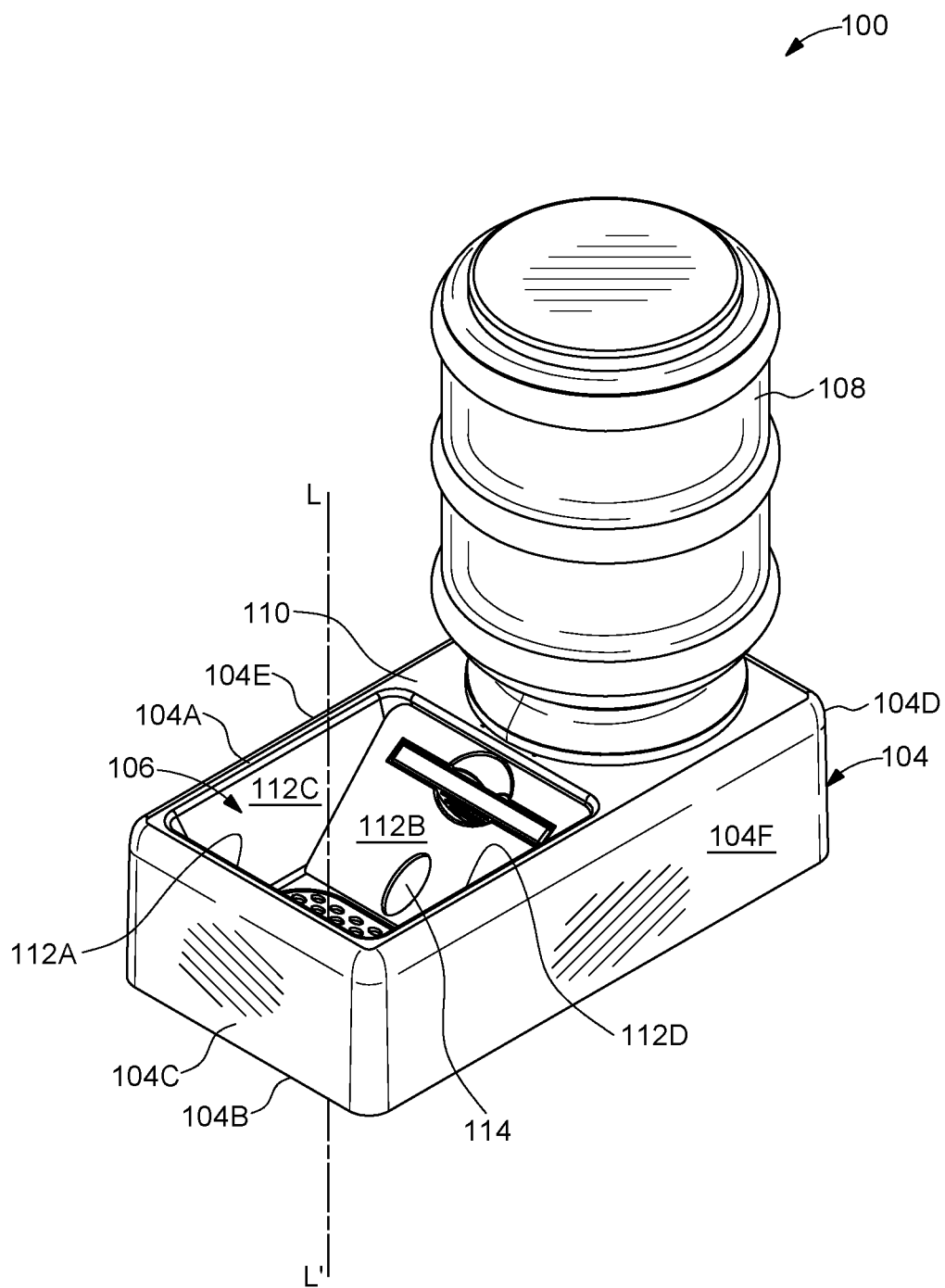
FIG. 1 illustrates a top perspective view of a pet hydration system, in accordance with an illustrative configuration of the present disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label. Where the reference label is used in the specification, the description is applicable to any one of the similar components having the same reference label.

DETAILED DESCRIPTION

Illustrative configurations are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed configurations. It is intended that the following detailed description be considered as illustrative only, with the true scope and spirit being indicated by the following claims.

A practice of hydrogenating water (i.e. adding hydrogen gas to water) consumed by humans has been gaining popularity. It is believed that hydrogenated water may be a source of antioxidants and may possess anti-inflammatory and anti-allergy properties. As such, hydrogen generating devices capable of generating and mixing hydrogen with water are being used. However, combining the capability of generating and mixing hydrogen with a pet hydration system has faced complications. For example, maintaining the level of hydrogen gas in the water is challenging as the mixed hydrogen rapidly escapes the water. This problem may be further accentuated by the fact that as the hydrogenated water is consumed by the pet from the bowl, the concentration of hydrogen in the replenished water in the bowl reduces. Furthermore, a pet water system should avoid over-saturating the water with hydrogen and/or continue to (attempt) hydration-generation when the water is fully depleted. As such, the available pet hydration systems are partially, or completely, unable to: provide a consistent supply of hydrogenated water; be easy to operate; durable; affordable; serviceable; easy to construct; and many other requirements of a successful pet hydration system.

It is desirable to provide a pet hydration system which is capable of generating hydrogen gas and introducing the generated hydrogen gas in the water meant for consumption by a pet. Further, it is desirable to provide for filtering the water meant to be consumed by the pet. It may be further desirable to provide illumination sources which may emit to accentuate generation of hydrogen by the set of hydrogen-generation assemblies and provide an indication of whether pet hydration system is in a hydrogen generating mode or not.

Referring now to FIG. 1, a top perspective view 100 of a pet hydration system 102 is illustrated, in accordance with a configuration of the present disclosure. The pet hydration system 102 may include a tray 104, which may further include an upper surface 104A and a lower side 104B. In some configurations, the tray 104 may define a bowl section 106 along the upper surface 104A of the tray 104. Further, the bowl section 106 may be defined towards a first longitudinal end 104C of the tray. The bowl section 106 may be configured to temporarily store water therein. As such, the pet may consume water from the water temporarily stored in the bowl section 106.

The pet hydration system 102 may be made from a pet safe material. For example, in some configurations, the tray 104 of the pet hydration system 102 may be made from a material selected from plastic, ceramic, or metal. In some configurations, the bowl section 106 may be formed in the tray 104 by molding process (e.g. injection-molded plastic such as a polypropylene with or without additives).

In some configurations, the bowl section 106 may be defined by four planar surfaces configured as a frustum (frustum: a portion of a pyramid which remains after the upper portion of the pyramid is removed) defining a central axis L-L'. The four planar surfaces may include a first planar surface 112A transverse to the central axis L-L', a second planar surface 112B transverse to the central axis L-L', a third planar surface 112C transverse to the central axis L-L', and a fourth planar surface 112D transverse to the central axis L-L'. The first planar surface 112A may be defined towards the first longitudinal end 104C of the tray 104. The second planar surface 112B may be defined towards a second longitudinal end 104D of the tray 104. The third planar surface 112C may be defined towards a left lateral end 104E of the tray 104. The fourth planar surface 112D may be defined towards a right lateral end 104F of the tray 104. In some configurations, as illustrated in the FIG. 1, the second planar surface 112B may slant towards the first planar surface 112A of the tray 104. The angle of slant may range from 1 degree to 60 degrees from vertical; for example: the first planar surface 112A, the third planar surface 112C, and the fourth planar surface 112D may be 15 degrees from vertical while the second planar surface 112B may be 50 degrees from vertical. It is noted that these angles may be varied by a predetermined range, such as plus or minus fourteen degrees. While angled planar surfaces of the bowl section 106 may provide a number of benefits, two particular benefits include easy cleaning of these flat surfaces and stoppage of waves-of-water created by a tongue of the pet causing water to move as the pet drinks the hydrogenated water.

With continued reference to FIG. 1, the pet hydration system 102 may be configured to receive a water reservoir 108. To this end, the tray 104 may include a reservoir section 110. The reservoir section 110 may be defined opposite the bowl section 106. As such, the reservoir section 110 may be defined towards the second longitudinal end 104D of the tray 104 and may be configured to receive the water reservoir 108. It may be noted that, in some configurations, the water reservoir 108 may have a circular opening which may engage with a similar formation in the reservoir section 110, to enable positioning of the water reservoir 108 on the tray 104. As such, the water reservoir 108 may be removable from and therefore replaceable on the pet hydration system 102. It may be further noted that the water reservoir 108 may be a custom-made water reservoir 108 meant specially for the pet hydration system 102. Alternately, the water reservoir 108 may be an off-the-shelf water reservoir meant for storing water.

The reservoir section 110 may be configured to dynamically supply water from the water reservoir 108 to the bowl section 106, in response to the water in the bowl section 106 lowering below a predefined level. As will be understood, as the water is consumed (by the pet) from the bowl section 106, the level of water in the bowl section 106 falls. However, the reservoir section 110 ensures that the level of water in the bowl section 106 does not lower below the predefined level by dynamically supplying water from the water reservoir 108 to the bowl section 106. The tray 104 may further define a gravity-fed chute formed in the tray 104 that may be positioned between the reservoir section 110 and the bowl section 106. This is further explained in detail in conjunction with FIGS. 14-15.

In some configurations, the second planar surface 112B of the pet hydration system 102 may include a channel 114 formed in the bowl section 106. In some configurations, the channel 114 may be positioned in the middle of the second planar surface 112B. The channel 114 may be configured to channel water flowing from the water reservoir 108 into the bowl section 106. Further, the channel 114 may be configured to guide water emitted from the channel 114 towards a hydrogen-generation assembly (as described herein).

Figure 2:
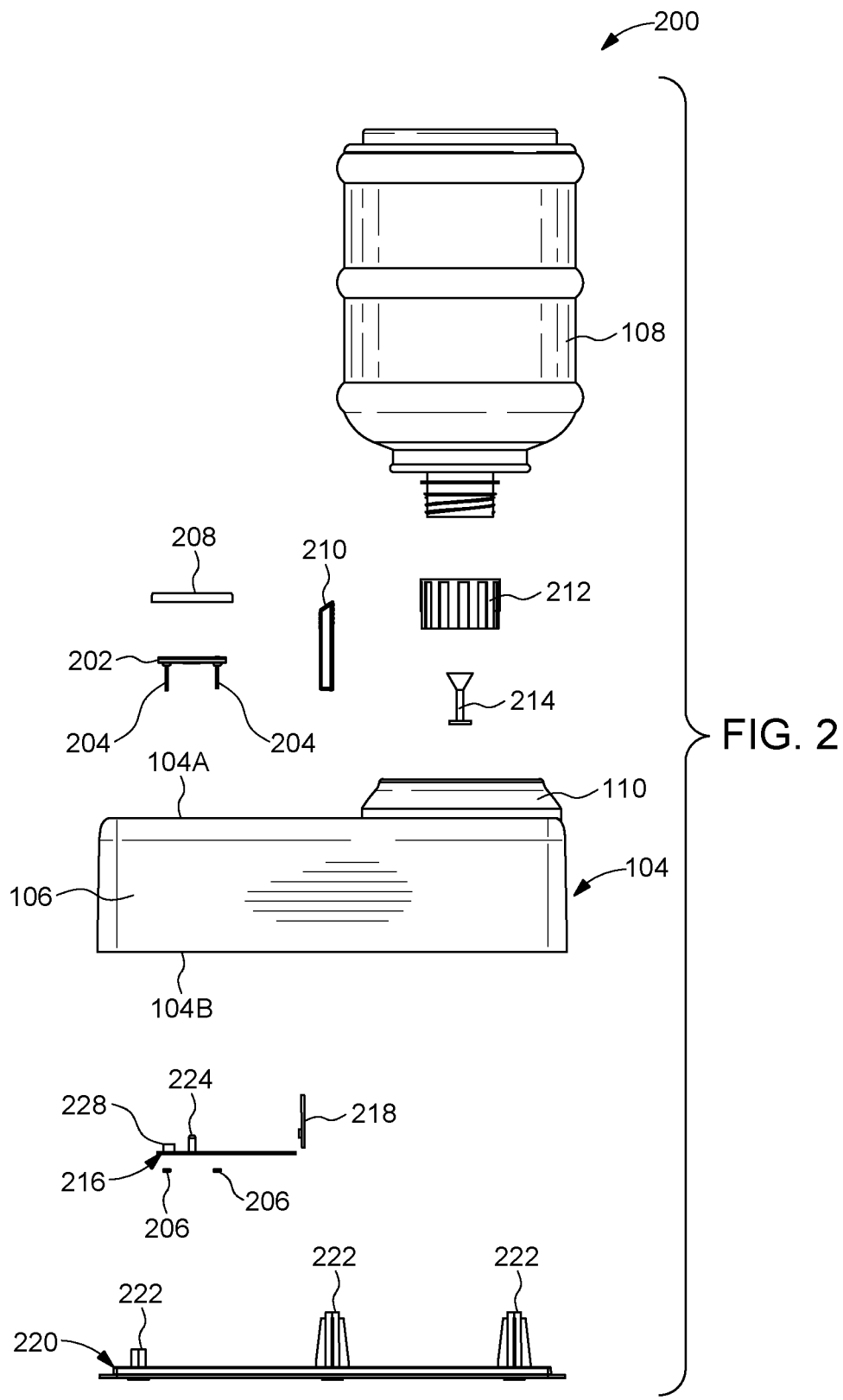
FIG. 2 illustrates an exploded side view of the pet hydration system, in accordance with an illustrative configuration of the present disclosure.

Referring now to FIG. 2, an exploded side view 200 of the pet hydration system 102 are illustrated, in accordance with some configurations of the present disclosure. As illustrated in the FIG. 2, the pet hydration system 102 may further include a set of hydrogen-generation assemblies 202.

Figure 3:
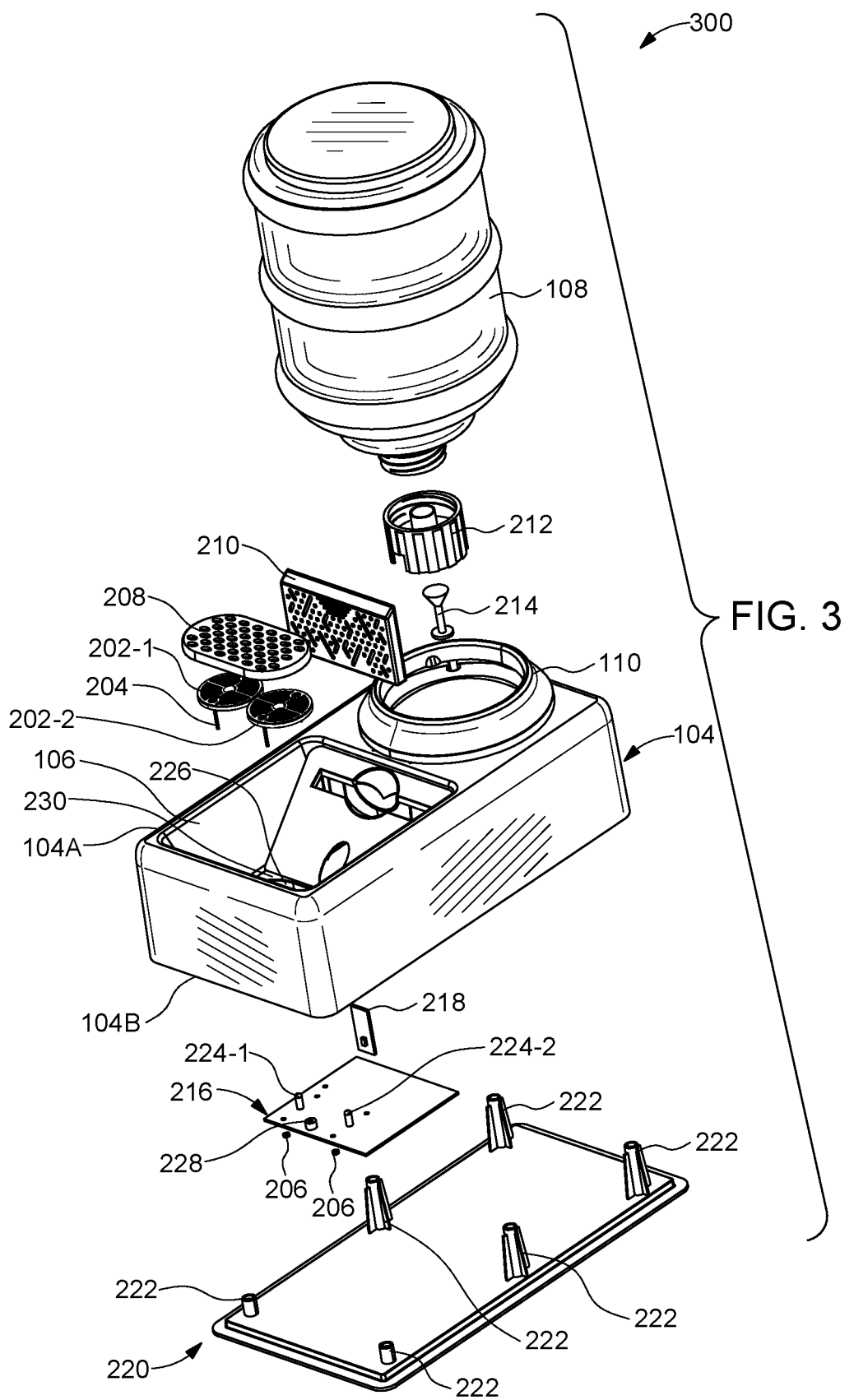
FIG. 3 illustrates an exploded top perspective view of the pet hydration system, in accordance with an illustrative configuration of the present disclosure.

With reference to FIG. 3, an exploded top perspective view 300 of an illustrative configuration of the pet hydration system 102 is illustrated. As illustrated in the FIG. 3, the set of hydrogen-generation assemblies 202 may be configured to be positioned within an assembly housing 226 defined on an inner surface 230 at a base of the bowl section 106. The set of hydrogen-generation assemblies 202 is further explained in conjunction with FIGS. 5-10.

With continued reference to FIG. 3, the assembly housing 226 may include a set of slots configured to receive the set of hydrogen-generation assemblies 202. The set of slots are further explained in detail in conjunction with FIGS. 12-13. Each of the set of slots may include fastening means to lock the set of hydrogen-generation assemblies 202 in place. In other words, the set of hydrogen-generation assemblies 202 may be fitted to the tray 104 via the set of slots using the fastening means. For example, the fastening means may include one or more bolts 204 and nuts 206. The bolts 204 may pass through the base of the bowl section 106 to fit the set of hydrogen-generation assemblies 202 to the tray 104.

In some configurations, the set of hydrogen-generation assemblies 202 may include two hydrogen-generation assemblies, i.e., a first hydrogen-generation assembly 202-1 and a second hydrogen-generation assembly 202-2. Each of the set of hydrogen-generation assemblies 202 may include a hole defined in the center of the set of hydrogen-generation assembly. The hole of each of the set of hydrogen-generation assemblies 202 may define a light path.

As illustrated, for example, in FIG. 3, the pet hydration system 102 may further include a set of illumination sources 224. For example, as shown in FIG. 3, the set of illumination sources 224 may include two illumination sources, i.e. a first illumination source 224-1 and a second illumination source 224-2. Each of the set of illumination sources 224 may be aligned with the holes of the set of hydrogen-generation assemblies 202. In other words, each of the set of illumination sources 224 may be coaxial to the hole of respective hydrogen-generation assembly of the set of hydrogen-generation assemblies 202. In particular, the first illumination source 224-1 may be coaxial with the hole of the first hydrogen-generation assembly 202-1. Similarly, the second illumination source 224-2 may be coaxial with the hole of the second hydrogen-generation assembly 202-2. Each of the set of illumination sources 224 may be configured to generate and emit light via the light path defined by the holes to illuminate hydrogen generated by the hydrogen-generation assembly along the light path. In some configurations, the set of illumination sources 224 may be configured to emit light when the set of hydrogen generating assemblies are turned ON, i.e., generating hydrogen. Once the set of hydrogen generating assemblies is turned OFF, the set of illumination sources 224 may also stop emitting light. As such, the set of illumination sources 224 is configured to provide an indication as to whether the pet hydration system 102 is generating hydrogen or not.

Figure 4:
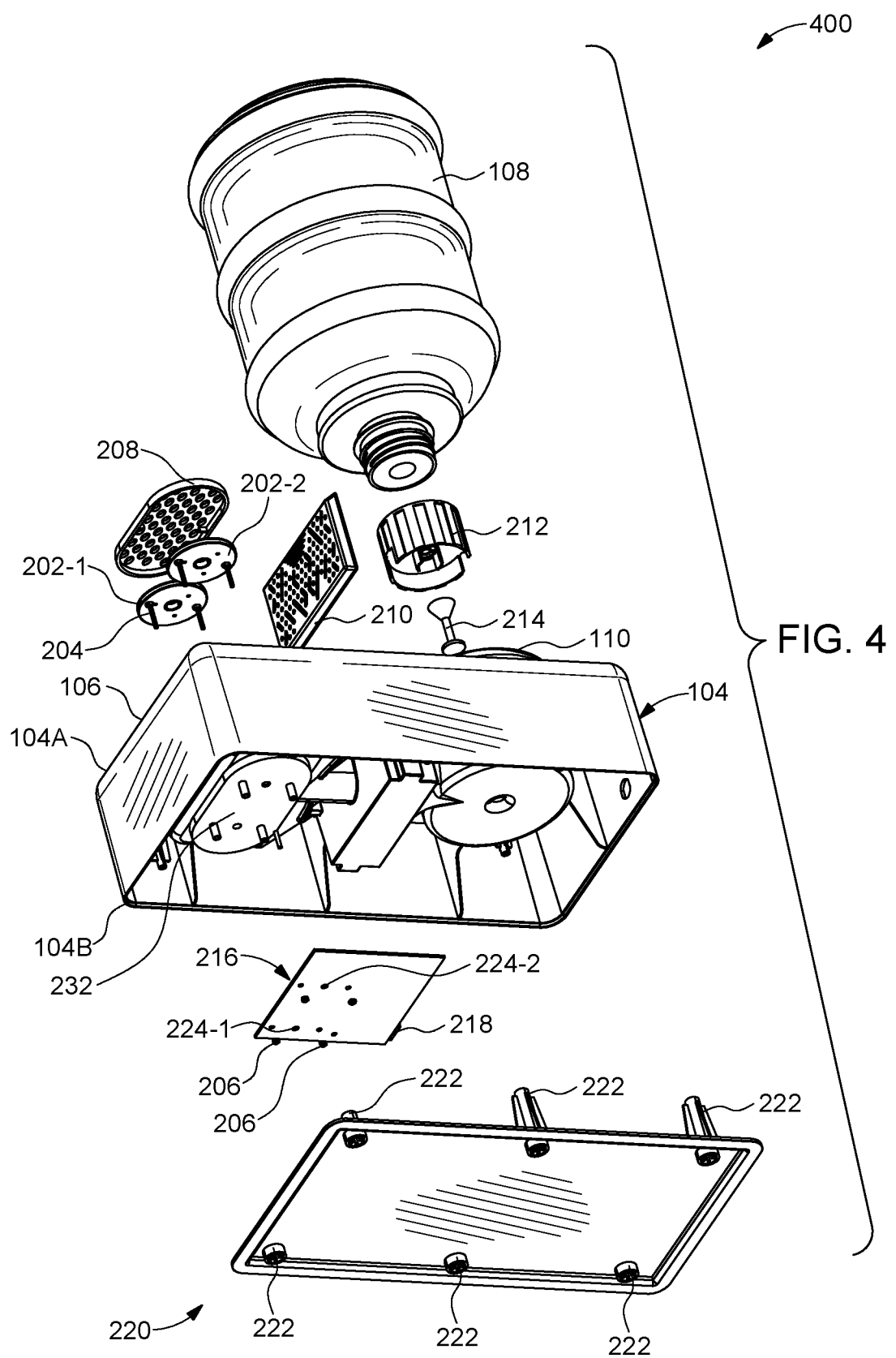
FIG. 4 illustrates an exploded bottom perspective view of the pet hydration system, in accordance with an illustrative configuration of the present disclosure.

With reference to FIG. 4, a bottom-side perspective view 400 of the pet hydration system 102 is illustrated. As illustrated, in some configurations, the set of illumination sources 224 may be configured to be positioned on an outer surface 232 of the base of the bowl section 106. Further. as illustrated, the pet hydration system 102 may further include a perforated sheet 208. The perforated sheet 208 may be configured to cover the set of hydrogen-generation assemblies 202 positioned in the set of slots. As such, the perforated sheet 208 may be positioned adjacent to the set of hydrogen-generation assemblies 202 and configured to obstruct contacting the set of hydrogen-generation assembly 202. As will be understood, while the pet is consuming water from the bowl section 106, the pet may come in contact with the set of hydrogen-generation assemblies 202. As the set of hydrogen-generation assemblies 202 are configured for causing electrolysis of water, an electric charge may be running in the set of hydrogen-generation assemblies 202. Therefore, it is desirable to prevent the pet from coming in direct contact with the set of hydrogen-generation assemblies 202. The perforated sheet 208 may define a plurality of perforations on its surface. These perforations may allow water to seep through and contact the set of hydrogen-generation assemblies 202 for electrolysis of water. However, the plurality of perforations may be sized to prevent the pet from contacting the set of hydrogen-generation assemblies 202. In some configurations, the perforated sheet 208 may be fitted to the set of slots using fastening means, for example, bolts, locking pins, locking formations, etc. Further, the perforated sheet 208 may be removable from the set of slots to allow cleaning and replacement of the set of hydrogen-generation assemblies 202 and the perforated sheet 208. The perforated sheet 208 may be made from a pet safe material, for example, plastic.

With continued reference to FIG. 4, the pet hydration system 102 may further include a filter cartridge 210. The filter cartridge 210 may be configured to filter the water flowing from the reservoir section 110 towards the bowl section 106. The water received from the water reservoir 108 may include impurities like dust, microbes, etc. As such, it is desirable to remove these impurities from the water before being made available for consumption by the pet. To this end, the filter cartridge 210 may include tiny perforations on the surface of the filter cartridge 210 that may filter out (i.e. block passage of) large sized impurities. Further, in some configurations, the filter cartridge 210 may include activated carbon for purifying the water passing through the filter cartridge 210. Further, in some configurations, the filter cartridge 210 may include a coating of an anti-microbial material provided on the surface of the filter cartridge 210.

With continued reference to the FIGS. 2-4, the pet hydration system 102 may further include a circuit board 216 operationally attached to the set of illumination sources 224. The circuit board 216 may be positioned underneath the bowl section 106, i.e. towards the lower side 104B of the tray 104. The circuit board 216 may be fitted to the tray 104 by the fastening means, i.e., the one or more bolts 204 and nuts 206.

In some configurations, as shown in the FIG. 2 and FIG. 3, the set of illumination sources 224 may be positioned on the circuit board 216. The set of illumination sources 224 may be electrically coupled to the circuit board 216. As such, for ease of construction, the set of illumination sources 224 may be attached to the circuit board 216, for example, by way of soldering. The pet hydration system 102 may further include a red-colored light source formed in the set of illumination sources 224. In some configurations, the red-colored light source may be configured in a Light Emitting Diode (LED). The red-colored light source may be configured to emit red spectrum when water in the bowl section is below a predetermined level. The pet hydration system 102 may further include a sound source 228 operationally attached to the circuit board 216. In some configurations, the sound source 228 may be a piezoelectric speaker configured to generate a beeping sound. For example, the sound source may be configured to emit the beeping sound when water in the bowl section 106 is below a predetermined level.

The circuit board 216 may be electrically coupled to each of the set of hydrogen-generation assemblies 202. Further, the circuit board 216 may be configured to supply electricity to the set of hydrogen-generation assemblies 202 for generating hydrogen gas bubbles by performing electrolysis of the surrounding water and thereby introducing the hydrogen gas bubbles in the water stored in the bowl section 106. In some configurations, each of the set of illumination sources 224 may be a Light Emitting Diode (LED). Further, in some configurations, each of the set of illumination sources 224 may include a blue-color light source configured in a Light Emitting Diode (LED). In other configurations, each of the set of illumination sources 224 may include a red-color light source configured in a LED, or a Red-Green-Blue color light source configured in a LED that can emit different colors from the same LED.

With reference to FIG. 3, the circuit board 216 may be further electrically coupled to a water level sensor 218. The water level sensor 218 may be configured to detect the level of water in the bowl section 106. The water level sensor 218 may be positioned in proximity to the bowl section 106.

As mentioned above, the reservoir section 110 may be configured to receive the water reservoir 108. As illustrated in the FIGS. 1-4, the water reservoir 108 may be positioned upside down on the reservoir section 110. To this end, the water reservoir 108 may be fitted with a cap 212. The cap 212 may include a valve member 214. The cap 212 is further explained in detail, in conjunction with FIGS. 16-20.

Referring back to the FIG. 2, in some configurations, the pet hydration system 102 may further include a bottom panel 220. The bottom panel 220 may be configured to be positioned on and attached to the lower side of the tray 104. The bottom panel 220 may provide for securing one or more components fitted in the lower side of the tray 104, i.e., the circuit board 216 and the water level sensor 218. In some configurations, in order to attach the bottom panel 220 to the tray 104, the bottom panel 220 may include one or more locking formations 222. In some configurations, the one or more locking formations 222 may be configured to engage with corresponding one or more indents formed on the lower side 104B of the tray 104, to attach to the lower side of the tray 104. In alternate configurations, the one or more screws may be used to fasten the one or more locking formations 222 with the one or more indents formed on the lower side 104B of the tray 104.

Figure 5:
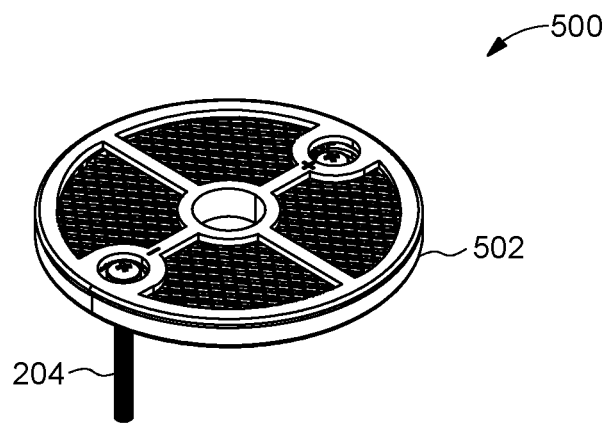
FIG. 5 illustrates a perspective view of an assembled hydrogen-generation assembly, in accordance with an illustrative configuration of the present disclosure.

Referring now to FIG. 5, a perspective view 500, of an assembled hydrogen-generation assembly 502 (of the set of hydrogen-generation assemblies 202) are illustrated, in accordance with some configurations of the present disclosure. The hydrogen-generation assembly 502 may include a cathode plate, an anode plate, and a spacer sandwiched between the cathode plate and the anode plate. An example cathode plate or anode plate is illustrated in the FIG. 9. Further, the assembled hydrogen-generation assembly 502 may include a bottom disc. An example bottom disc is illustrated in the FIG. 8. The assembled hydrogen-generation assembly 502 may be configured to be fitted to the tray 104 using one or more bolts 204.

Figure 6:
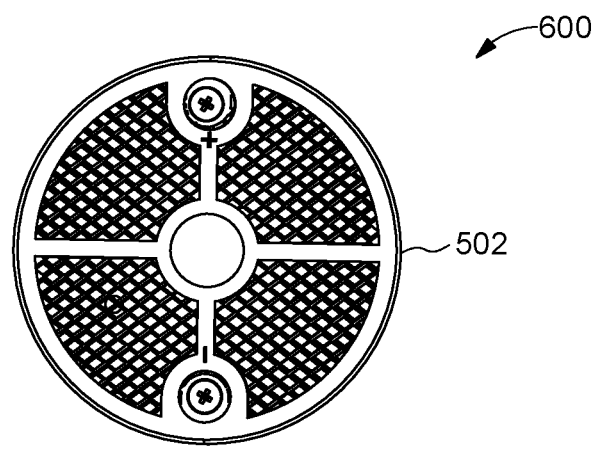
FIG. 6 illustrates a top view of the assembled hydrogen-generation assembly, in accordance with an illustrative configuration of the present disclosure.
Figure 7:
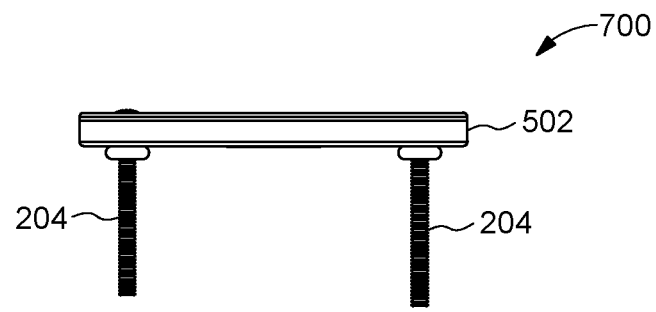
FIG. 7 illustrates a side view of the assembled hydrogen-generation assembly, in accordance with an illustrative configuration of the present disclosure.

FIG. 6, FIG. 7, show a top view 600, and a side view 700 of one configuration of the hydrogen-generation assembly 502, respectively.

Figure 8:
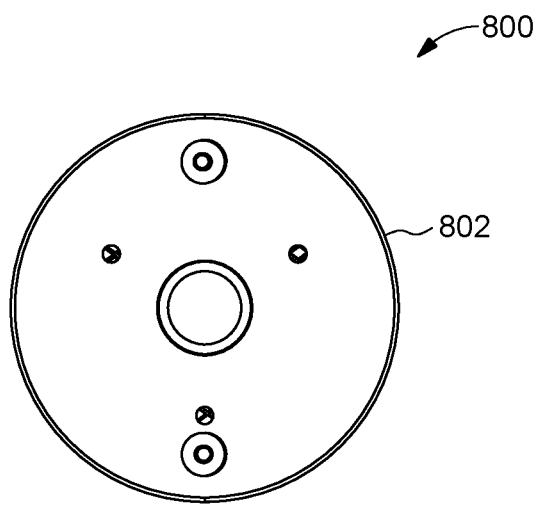
FIG. 8 illustrates a bottom view of the assembled hydrogen-generation assembly, in accordance with an illustrative configuration of the present disclosure.

With reference to the FIG. 8, a top view 800 of a bottom disc 802 is illustrated, in accordance with some configurations of the present disclosure. The bottom disc 802 is further explained in conjunction with FIG. 10.

Figure 9:
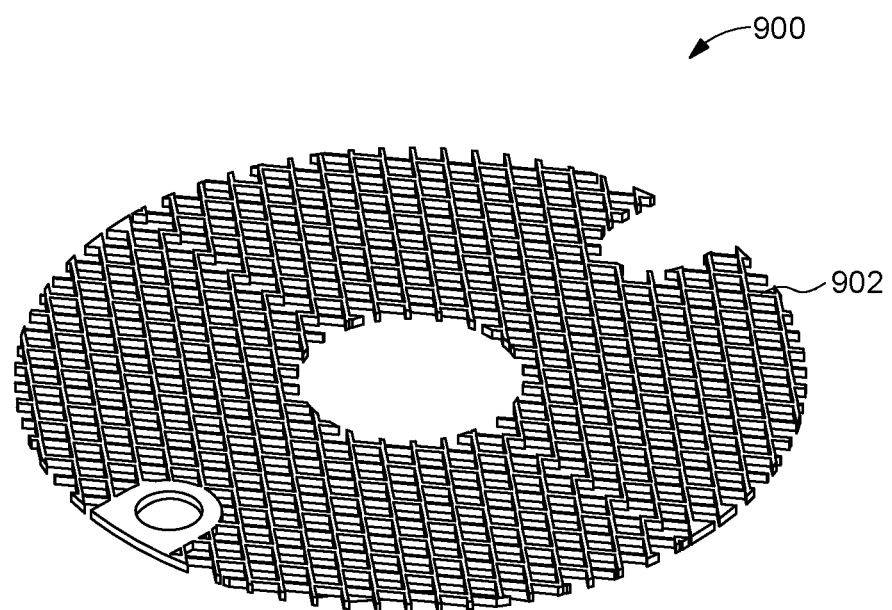
FIG. 9 illustrates a perspective view of an electrode (corresponding to a cathode plate or an anode plate of the hydrogen-generation assembly of FIG. 5), in accordance with an illustrative configuration of the present disclosure.

With reference to the FIG. 9, a perspective view 900 of an example electrode 902 (corresponding to the cathode plate or the anode plate) is illustrated, in accordance with some configurations of the present disclosure. The electrode 902, i.e., each of the cathode plate and the anode plate include a mesh. Further, as shown in the FIG. 9, in some configurations, the cathode plate and the anode plate may include a circular perimeter. The hydrogen-generation assembly 502 is further explained in conjunction with FIG. 10.

Figure 10:
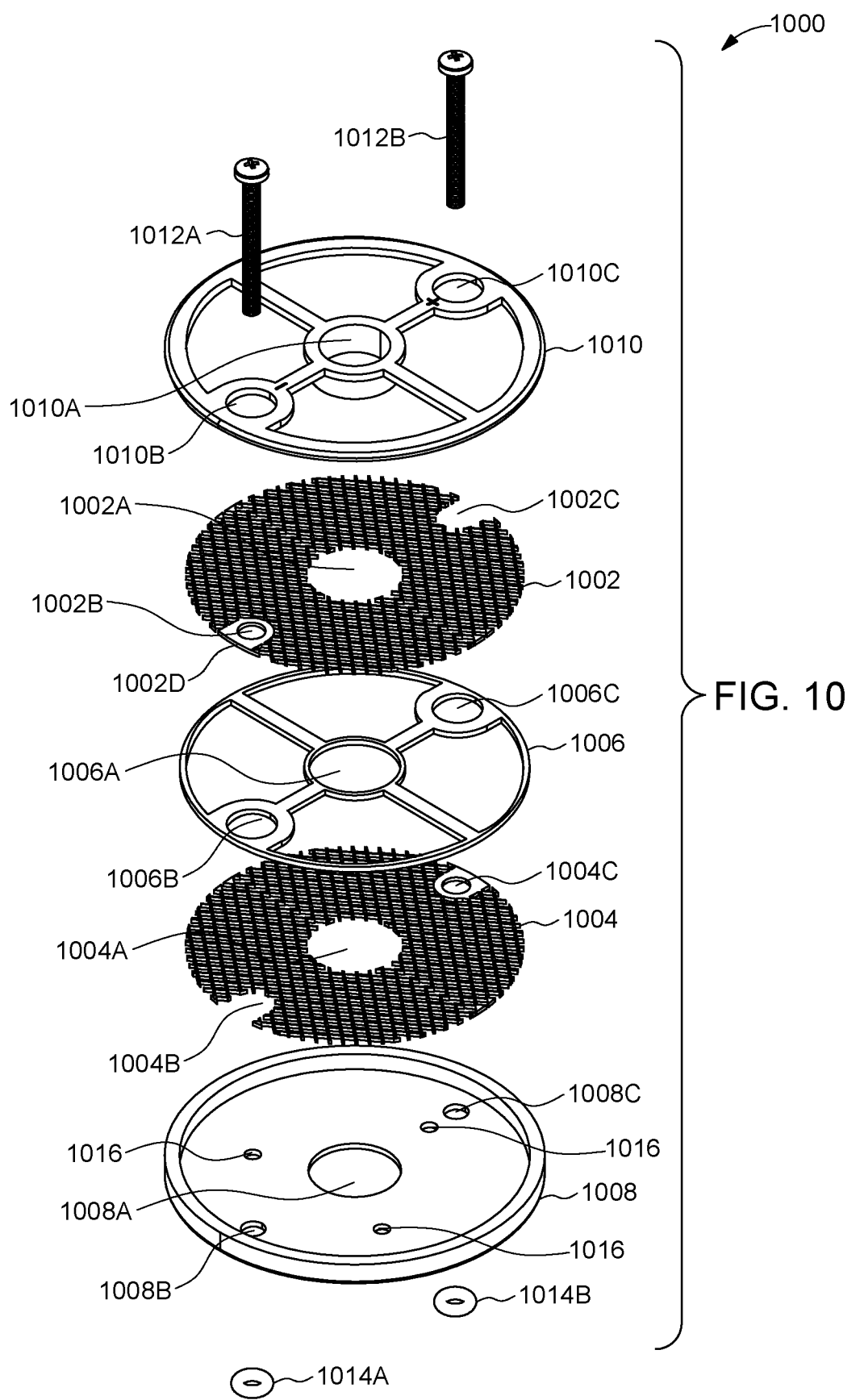
FIG. 10 illustrates an exploded top perspective view of a hydrogen-generation assembly, in accordance with an illustrative configuration of the present disclosure.

Referring now to FIG. 10, an exploded top perspective view 1000 of the hydrogen-generation assembly 502 (of the set of hydrogen-generation assemblies 202) is illustrated, in accordance with some configurations of the present disclosure. As illustrated in the FIG. 10, the hydrogen-generation assembly 502 may include a cathode plate 1002, an anode plate 1004, and a spacer 1006. The anode plate 1004 may be formed parallel to and offset from the cathode plate 1002. Further, the spacer 1006 may be sandwiched between the cathode plate 1002 and the anode plate 1004. The hydrogen-generation assembly 502 may further include a bottom disc 1008 (corresponding to the bottom disc 802) and a top frame 1010. The assembly of the cathode plate 1002, the anode plate 1004, and the spacer 1006 may be configured to generate hydrogen gas by electrolysis of the surrounding water, i.e., the water temporarily stored in the bowl section 106. The generated hydrogen gas is then introduced into the water temporarily stored in the bowl section 106.

The cathode plate 1002, the anode plate 1004, the spacer 1006, the bottom disc 1008, and the top frame 1010 may include concentrically aligned holes to define a light path. In particular, the cathode plate 1002 may include a hole 1002A, the anode plate 1004 may include a hole 1004A, and the spacer 1006 may include a hole 1006A. Further, the bottom disc 1008 and the top frame 1010 may include a hole 1008A and a hole 1010A, respectively. The hole 1002A, the hole 1004A, the hole 1006A, the hole 1008A, and the hole 1010A may be concentrically aligned.

With continued reference to FIG. 10, in some configurations, as illustrated in the FIG. 10, the cathode plate 1002, the anode plate 1104, the spacer 1006, the bottom disc 1008, and the top frame 1010 may include a circular perimeter. The cathode plate 1002 and the anode plate 1104 may be made of an electrically conductive material, for example, a metal. The spacer 1006 may be made of an electrically insulating material, for example, plastic, or rubber. It should be noted that the spacer 1006 may be configured to separate the cathode plate 1002 and the anode plate 1004. As illustrated in the FIG. 10, the spacer 1006 may include a ring portion and one or more ribs (e.g. four ribs). The bottom disc 1008 may be made from an electrically insulating material. The bottom disc 1008 may include one or more depressions (e.g., three depressions) formed on the lower surface of the bottom disc 1008. The one or more depressions may engage with one or more protrusions on the base of the bowl section 106. In other configurations, the spacer 1006 may be a membrane that passes electrons and/or gasses while reducing/eliminating the flow of water across the spacer 1006.

With continued reference to FIG. 10, the cathode plate 1002, the anode plate 1004, the spacer 1006, the bottom disc 1008, and the top frame 1010 may be configured to be assembled and held together by fastening means, i.e., the bolts 1012A, 1012B, and nuts 1014A, 1014B (corresponding to the bolts 204 and nuts 206). To this end, each of the anode plate 1004, the spacer 1006, the bottom disc 1008, and the top frame 1010 may include a first assembly hole and a second assembly hole. In particular, the cathode plate 1002 may include a first assembly hole 1002B and a second assembly hole 1002C. The anode plate 1004 may include a first assembly hole 1004B and a second assembly hole 1004C. The spacer 1006 may include a first assembly hole 1006B and a second assembly hole 1006C. The bottom disc 1008 may include a first assembly hole 1008B and a second assembly hole 1008C. The top frame 1010 may include a first assembly hole 1010B and a second assembly hole 1010C.

The first assembly hole 1002B, the first assembly hole 1004B, the first assembly hole 1006B, the first assembly hole 1008B, and the first assembly hole 1010B may be aligned so as to allow the bolts 1012A to pass therethrough. Further, the second assembly hole 1002C, the second assembly hole 1004C, the second assembly hole 1006C, the second assembly hole 1008C, and the second assembly hole 1010C may be aligned so as to allow the bolts 1012B to pass therethrough. In order to assemble and hold together the cathode plate 1002, the anode plate 1004, the spacer 1006, the bottom disc 1008, and the top frame 1010, the nut 1014A and the nut 1014B may be tightened to the bolt 1012A and the bolt 1012B, respectively.

The cathode plate 1002 and anode plate 1004 may be configured to cause electrolysis of water surrounding the cathode plate 1002 and anode plate 1004. As will be understood, in order perform electrolysis, the cathode plate 1002 and anode plate 1004 may be coupled to electrical supply. In particular, the cathode plate 1002 may act as a negatively charged electrode at which hydrogen gas may be generated during the electrolysis. The anode plate 1004 may act as a positively charged electrode at which Oxygen gas may be generated during the electrolysis. In order to perform the electrolysis, the cathode plate 1002 and the anode plate 1004 may be electrically coupled to an electrical supply. The cathode plate 1002 may therefore be electrically coupled to the negative terminal of the electrical supply, and the anode plate 1004 may be electrically coupled to the positive terminal of the electrical supply.

In some configurations, the cathode plate 1002 and anode plate 1004 may be electrically coupled to electrical supply via the bolts 204. To this end, the bolts 204 may be made from an electrically conductive material, for example, Stainless Steel. In order to electrically couple the cathode plate 1002 with the negative terminal of the electrical supply, the bolt 1012A may contact the cathode plate 1002, via the first assembly hole 1002B. The first assembly hole 1002B may include a coupler 1002D attached to the cathode plate 1002. The coupler 1002D may be made from an electrically conductive material, for example, a metal. The coupler 1002D may be configured to allow the bolt 1012A to pass therethrough as well as electrically couple with the bolt 1012A. It should be noted that the first assembly hole 1004B of the anode plate 1004 is configured to not electrically couple with the bolt 1012A.

Further, in order to electrically couple the anode plate 1004 with the positive terminal of the electrical supply, the bolt 1012B may contact the anode plate 1004, via the first assembly hole 1004B. The first assembly hole 1004B may include a coupler 1004D attached to the anode plate 1004. The coupler 1004D may be made from an electrically conductive material, for example, a metal. The coupler 1004D may be configured to allow the bolt 1012B to pass therethrough as well as electrically couple with the bolt 1012B. Further, the second assembly hole 1002C of the cathode plate 1002 is configured to not electrically couple with the bolt 1012B. This is further explained in conjunction with FIGS. 11A-11B.

In some configurations, the pet hydration system 102 may further include a Universal Serial Bus (USB) port. Each of the set of hydrogen-generation assemblies 202 and the set of illumination sources 224 maybe electrically connected to the USB port. The USB port may provide an interface for supplying electricity to each of the at least one hydrogen-generation assemblies 202 and the set of illumination sources 224.

In alternate configurations, the pet hydration system 102 may include a round electric port for providing electrical supply to the set of hydrogen-generation assemblies 202 and the set of illumination sources 224. Further, in such configurations, the electrical supply may be provided using an alternating current (AC) power adaptor with a cord having a round pin. The round pin may engage with the round electric port. For example, the adaptor may convert the AC electric supply into 12 Volts Direct Current supply.

Figure 11A:
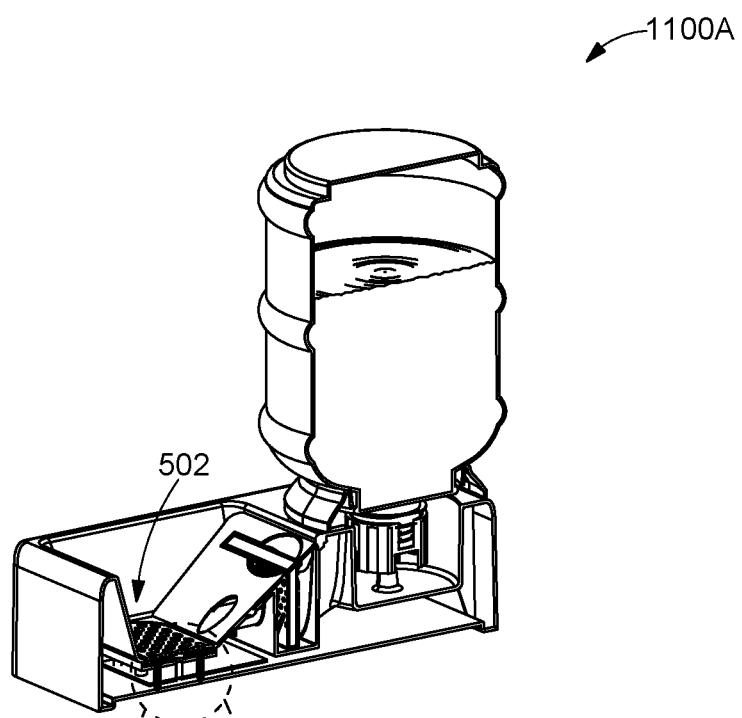
FIG. 11A illustrates a sectional side view of the pet hydration system, in accordance with an illustrative configuration of the present disclosure.
Figure 11B:
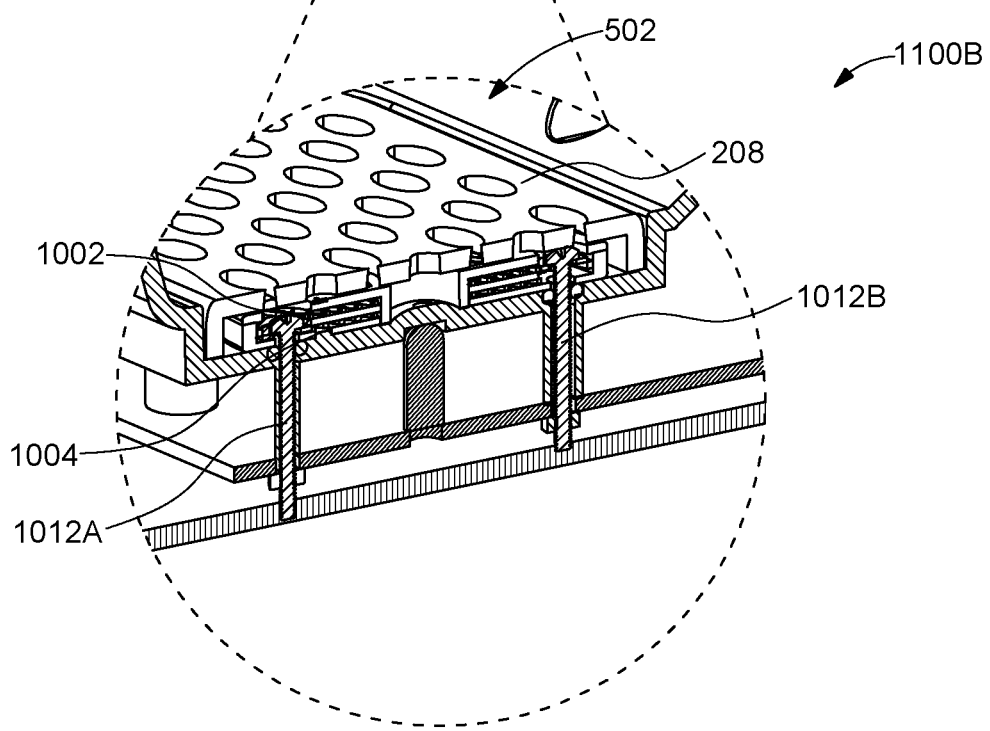
FIG. 11B illustrates a magnified sectional view of a hydrogen-generation assembly of the pet hydration system of FIG. 11A, in accordance with some configurations of the present disclosure.

Referring now to FIG. 11A, a sectional side view 1100A of the pet hydration system 102 is illustrated, in accordance with some configurations of the present disclosure. Referring to FIG. 11B, a magnified sectional view 1100B of the hydrogen-generation assembly 502 of the illustrative pet hydration system 102 is illustrated, in accordance with some configurations of the present disclosure.

Referring now to FIG. 11B, as illustrated, the bolt 1012A may contact the cathode plate 1002, however, the anode plate 1004 may not electrically couple with the bolt 1012A. Further, the bolt 1012B may contact the anode plate 1004, however, the cathode plate 1002 may not electrically couple with the bolt 1012B.

Figure 12:
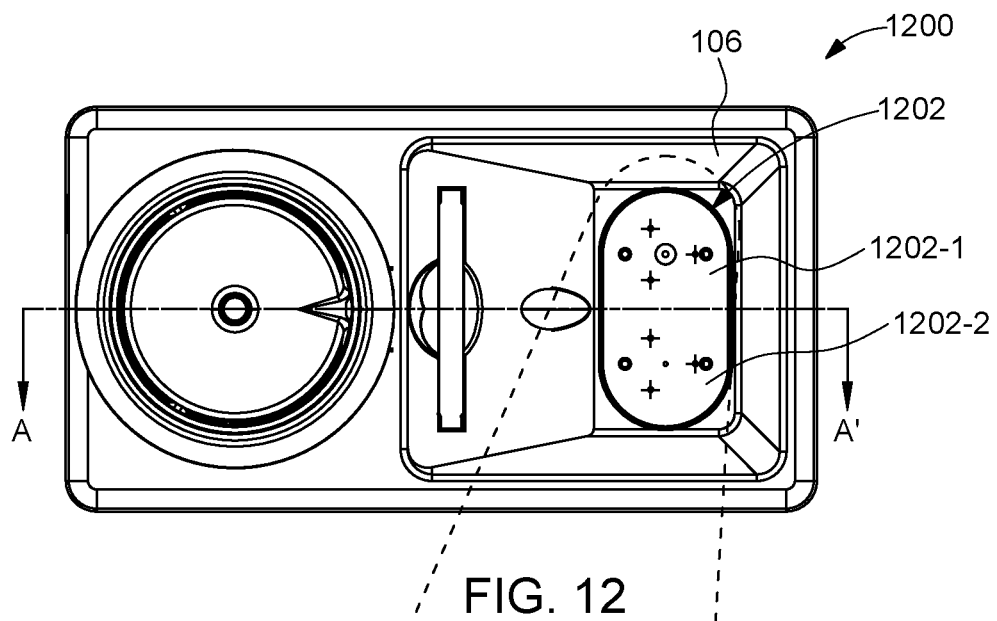
FIG. 12 illustrates a top view of the pet hydration system, in accordance with an illustrative configuration of the present disclosure.

Referring now to FIG. 12, a top view 1200 of the pet hydration system 102 (without the set of hydrogen-generation assemblies 202 or the perforated sheet 208) is illustrated, in accordance with some configurations of the present disclosure. As illustrated in the FIG. 12, the pet hydration system 102 may include a set of slots 1202 formed in the base of the bowl section 106 that may be configured to receive the set of hydrogen-generation assemblies 202. For example, as illustrated in the FIG. 12, the set of slots 1202 may include a first slot 1202-1 and a second slot 1202-2. As such, the first slot 1202-1 may be configured to receive the first hydrogen-generation assembly 202-1, and the second slot 1202-2 may be configured to receive the second hydrogen-generation assembly 202-2.

Figure 13:
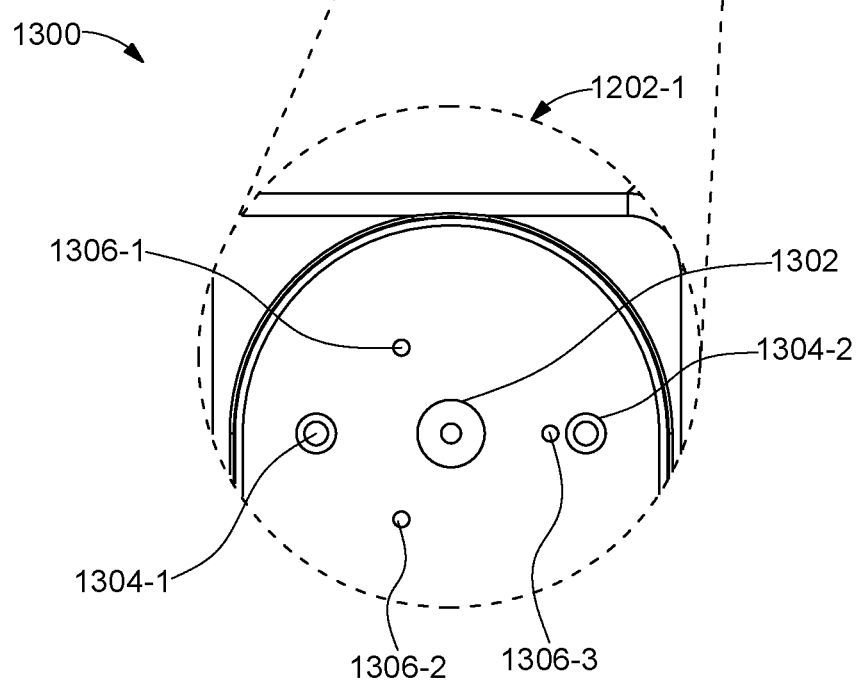
FIG. 13 illustrates a magnified view of a first slot depicted in the pet hydration system of the FIG. 12, in accordance with an illustrative configuration of the present disclosure.

Referring now to FIG. 13, a magnified view of the first slot 1202-1 depicted in the FIG. 12 is illustrated. As shown in the FIG. 13, the first slot 1202-1 may include a center hole 1302. The center hole 1302 may be configured to receive the first illumination source 224-1. Further, the center hole 1302 may be configured to form a leak proof connection with the first illumination source 224-1, to prevent any leakage of water through the hole center hole 1302, upon receiving the illumination source 224-1. The first slot 1202-1 may further include a set of assembly holes 1304-1, 1304-2. Each of the set of assembly holes 1304-1, 1304-2 may be configured to receive a bolt 204, for fastening the first hydrogen-generation assembly 202-1 to the tray 104. The first slot 1202-1 may further include a set of protrusions 1306-1, 1306-2, 1306-3. The set of protrusions 1306-1, 1306-2, 1306-3 may be configured to engage with the set of depressions formed on the lower surface of the bottom disc 1008 of the first hydrogen-generation assembly 202-1. As will be understood, the set of protrusions 1306-1, 1306-2, 1306-3 may be provided to correctly align the hydrogen-generation assembly 202 on the tray 104. Further, the set of protrusions 1306-1, 1306-2, 1306-3 may help in aligning the bolt 204 in the correct hole and therefore the correct terminal of the electrical supply. Similarly, a second slot 1202-2 may be provided for the second hydrogen-generation assembly 202-2.

Figure 14:
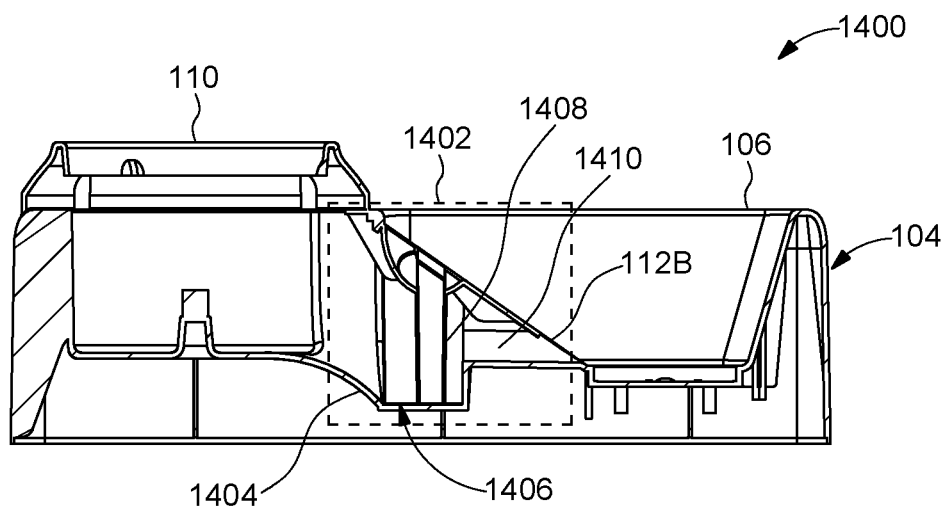
FIG. 14 illustrates a sectional side view (along an axis A-A' illustrated in FIG. 13) of the pet hydration system, in accordance with an illustrative configuration of the present disclosure.

Referring now to FIG. 14, a sectional side view 1400 (along an axis A-A' illustrated in FIG. 13) pet hydration system 102 is illustrated in accordance with some configurations of the present disclosure. As illustrated in the FIG. 14, the pet hydration system 102 may include a gravity-fed chute 1402 defined in the tray 104. The gravity-fed chute 1402 may be positioned between the reservoir section 110 and the bowl section 106. The gravity-fed chute 1402 may include a slanted base section 1404. The slanted base section 1404 may be slanted with respect to the horizontal in a range of ten to 80 degrees, but in one configuration about 35+/−10 degrees. The gravity-fed chute 1402 may be fluidically coupled to the reservoir section 110 and therefore may receive the water being supplied by the water reservoir 108 positioned on the reservoir section 110. The slanted base section 1404 of the gravity-fed chute 1402 may cause the cause water from the reservoir section 110 to flow towards the bowl section 106.

Figure 15:
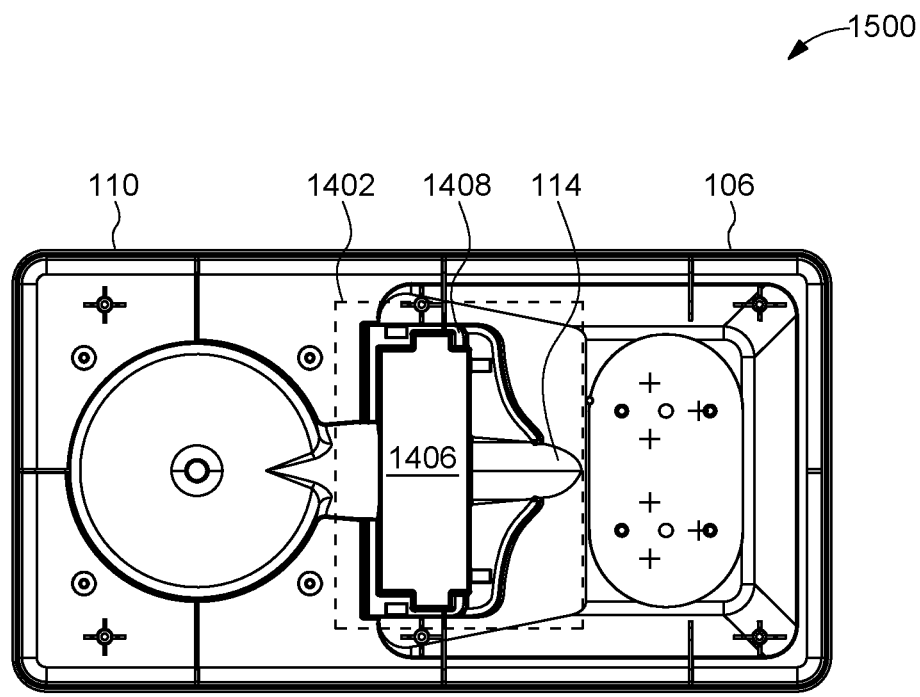
FIG. 15 illustrates another top view of the pet hydration system, in accordance with an illustrative configuration of the present disclosure.

With reference to FIG. 15, a top view 1500 of the pet hydration system 102 is illustrated in accordance with some configurations of the present disclosure. As illustrated in the FIG. 15, the tray 104 may further define an enlarged area 1406 within the gravity-fed chute 1402. The enlarged area 1406 may be wider in comparison to the remaining section of the gravity-fed chute 1402. In some configurations, the tray 104 may include at least one cartridge slot 1408 formed along the gravity-fed chute 1402. The at least one cartridge slot 1408 may be configured for mounting the filter cartridge 210, for example, by sliding-in the filter cartridge 210 in the at least one cartridge slot 1408. As such, the filter cartridge 210 may be removable from the at least one slot, for example, by manually sliding out the filter cartridge 210 from the at least one cartridge slot 1408. As will be understood, the filter cartridge 210 may have dimensions in accordance with the dimensions of the cartridge slot 1408, so as to snug fit in the cartridge slot 1408. As already mentioned before, the filter cartridge 210 configured to be positioned in the enlarged area 1406 may be further configured to filter the water flowing from the reservoir section 110 towards the bowl section 106.

Once the filter cartridge 210 is mounted in the cartridge slot 1408, i.e., in the filter cartridge-mounted configuration of the pet hydration system 102, a pocket 1410 may be defined between the filter cartridge 210 and a back side of the second planar surface 112B. Further, as mentioned above, the second planar surface 112B may include the channel 114 in the middle of the second planar surface 112B. The channel 114 may be configured to channel water from the pocket 1410 into the bowl section 106.

Figure 16:
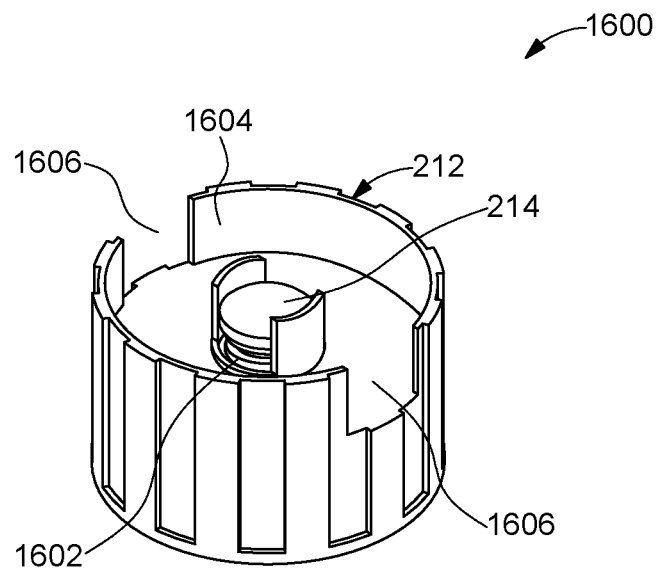
FIG. 16 illustrates a top perspective view of a cap, in accordance with an illustrative configuration of the present disclosure.

Referring now to FIG. 16, a top perspective view 1600 of the cap 212 are illustrated, in accordance with some illustrative configurations of the present disclosure. The cap 212 may be configured to assume an open position and a closed position by upward and downward movement, respectively, of the valve member 214. The valve member 214 may be spring loaded (downward), so as to the keep the cap 212 in closed position. As such, the cap 212 may include a spring 1602. In order to reconfigure the cap 212 in the open position, the valve member may be moved in the upward direction. The cap 212 may further include a wall 1604, and one or more cut-out regions 1606 defined in the wall 1604.

Figure 17:
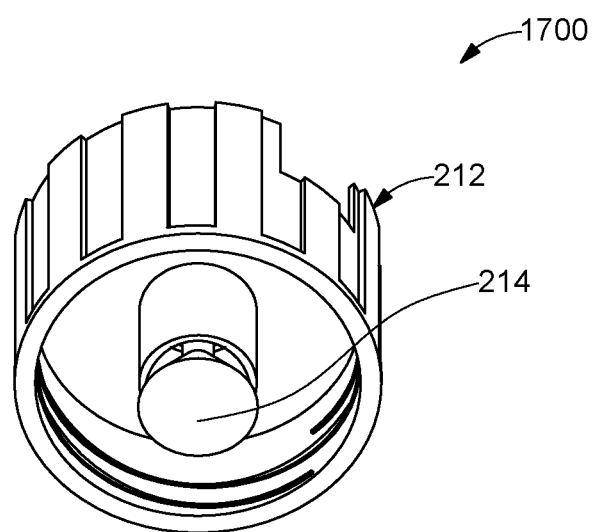
FIG. 17 illustrates a bottom perspective view of the cap, in accordance with an illustrative configuration of the present disclosure.
Figure 18:
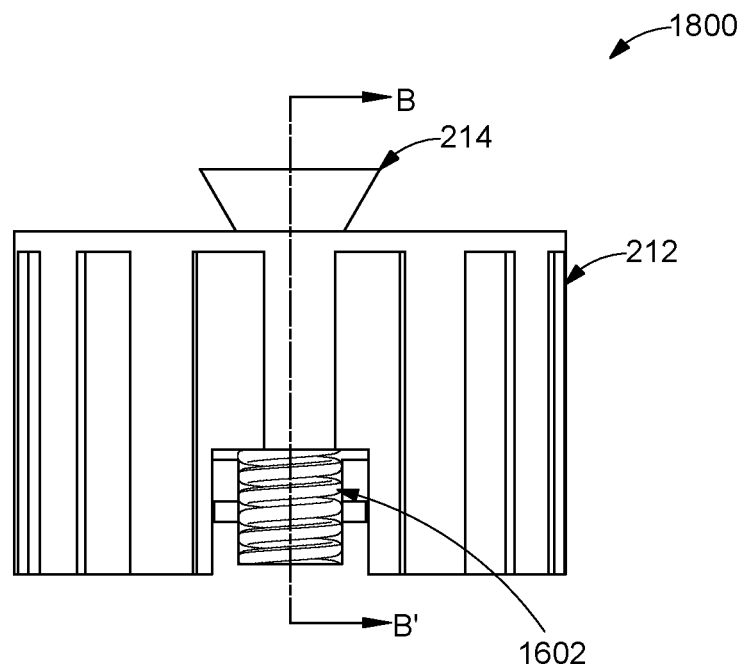
FIG. 18 illustrates a side view of the cap, in accordance with an illustrative configuration of the present disclosure.
Figure 19:
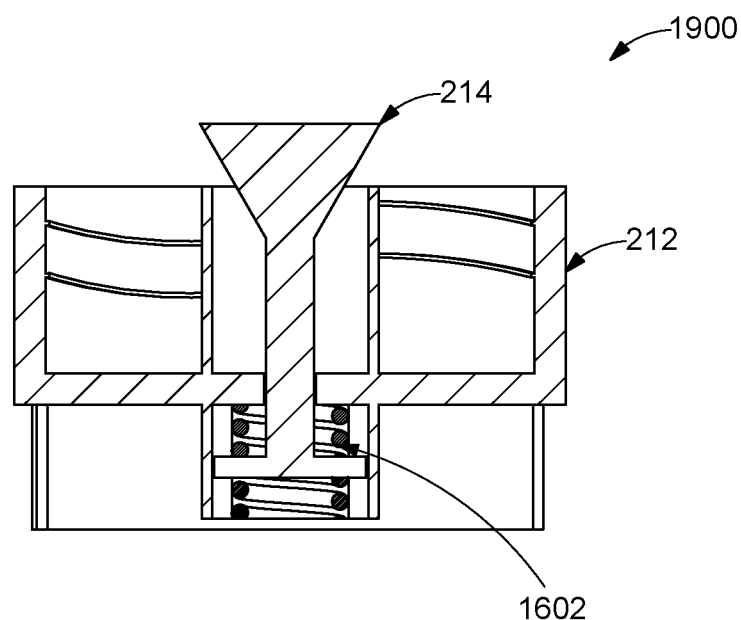
FIG. 19 illustrates a sectional side view of the cap, in accordance with an illustrative configuration of the present disclosure.

FIG. 17, FIG. 18, and FIG. 19 illustrate a bottom perspective view 1700, a side view 1800, and a sectional side view 1900 (sectional along an axis B-B' illustrated in FIG. 18) of the cap 212, respectively.

Figure 20:
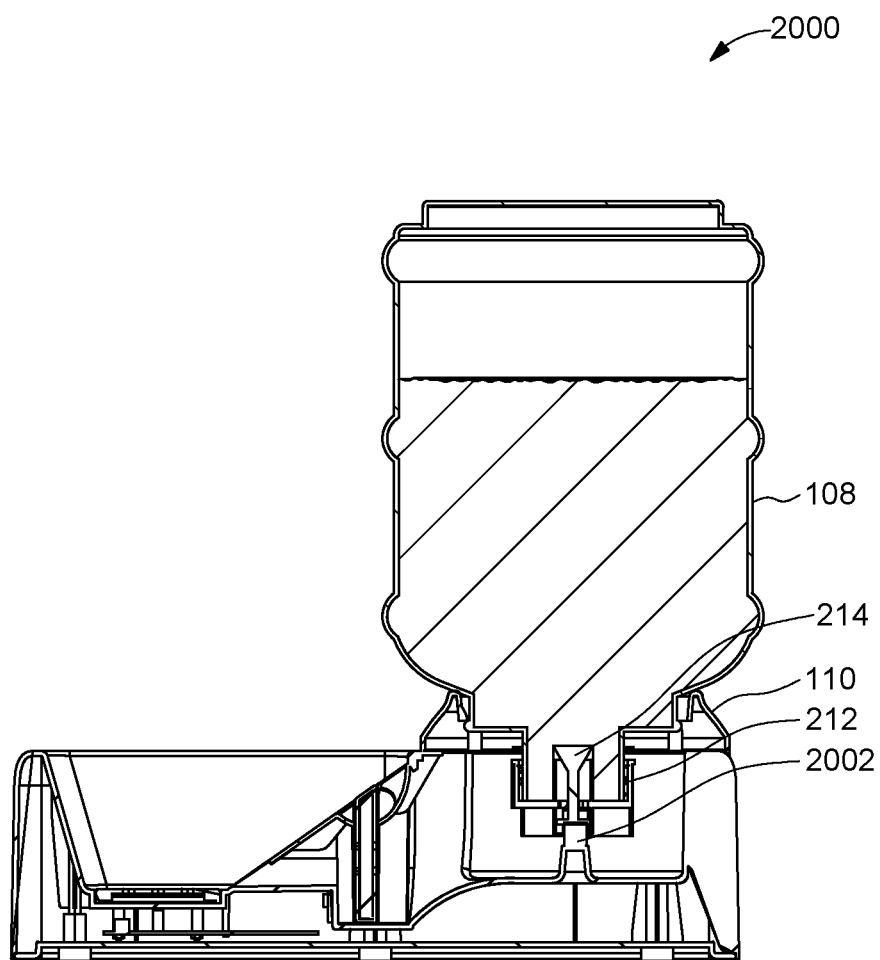
FIG. 20 illustrates a sectional side view of the pet hydration system, in accordance with an illustrative configuration of the present disclosure.
Figure 21:
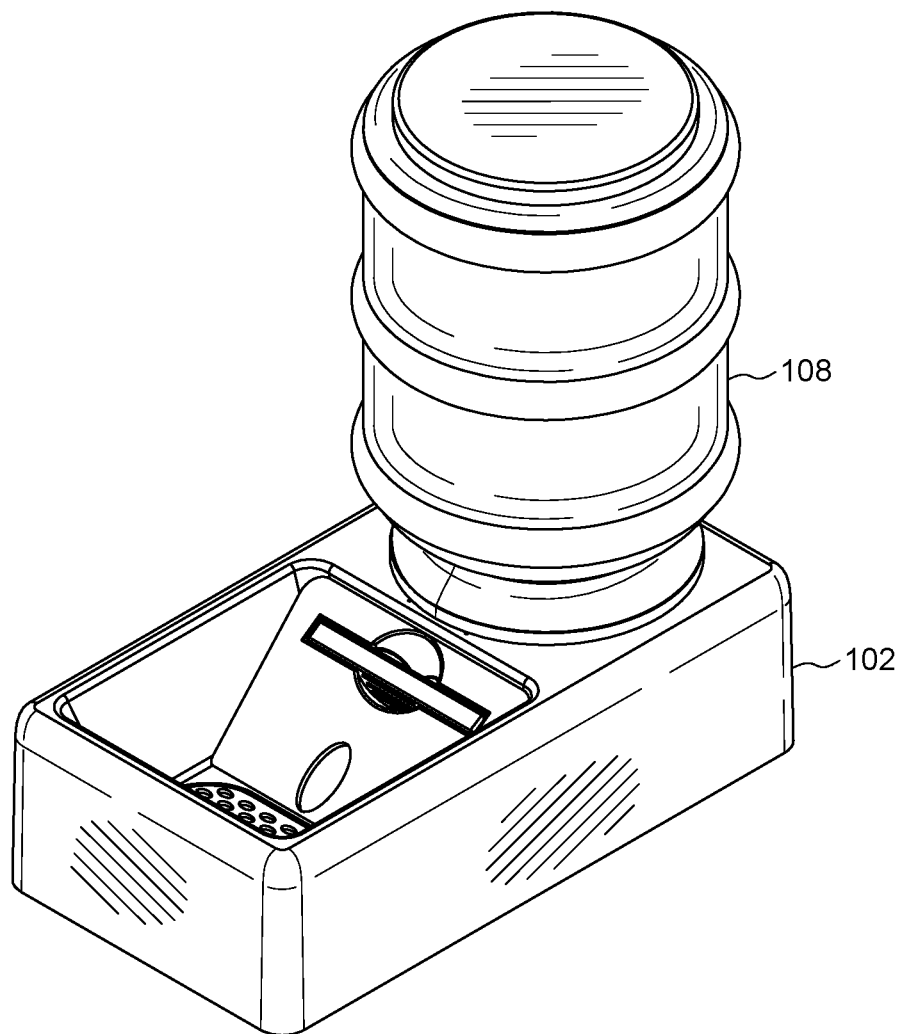
FIGS. 21-27 illustrate views (i.e., a perspective view, a front view, a rear view, a left side view, a top view, a right side view, and a bottom view, respectively) of an ornamental design of a pet hydration system fitted with a water reservoir, in accordance with an illustrative configuration of the present disclosure.
Figure 22:
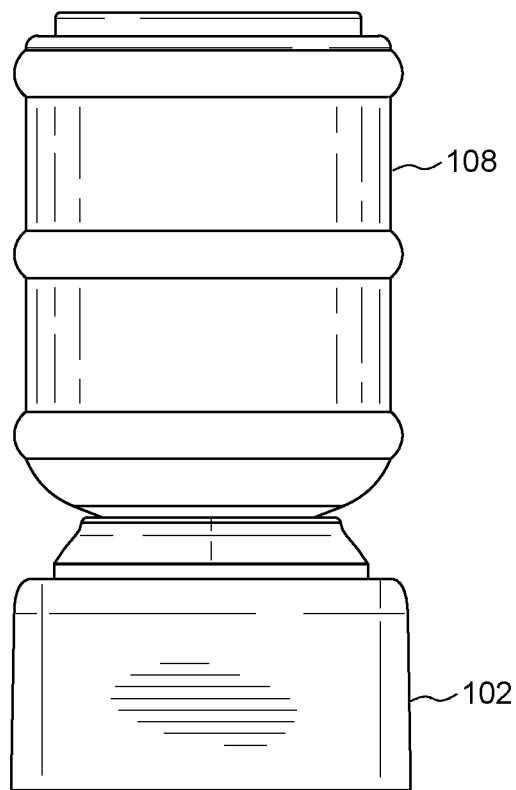
Figure 23:
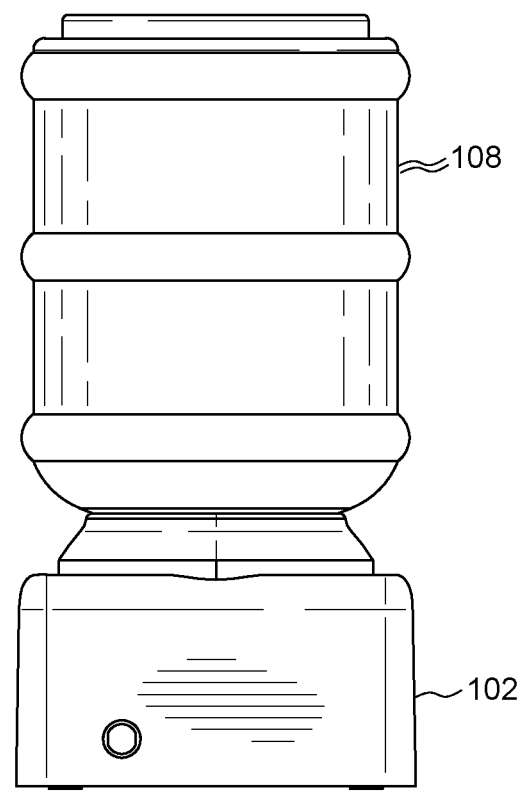
Figure 24:
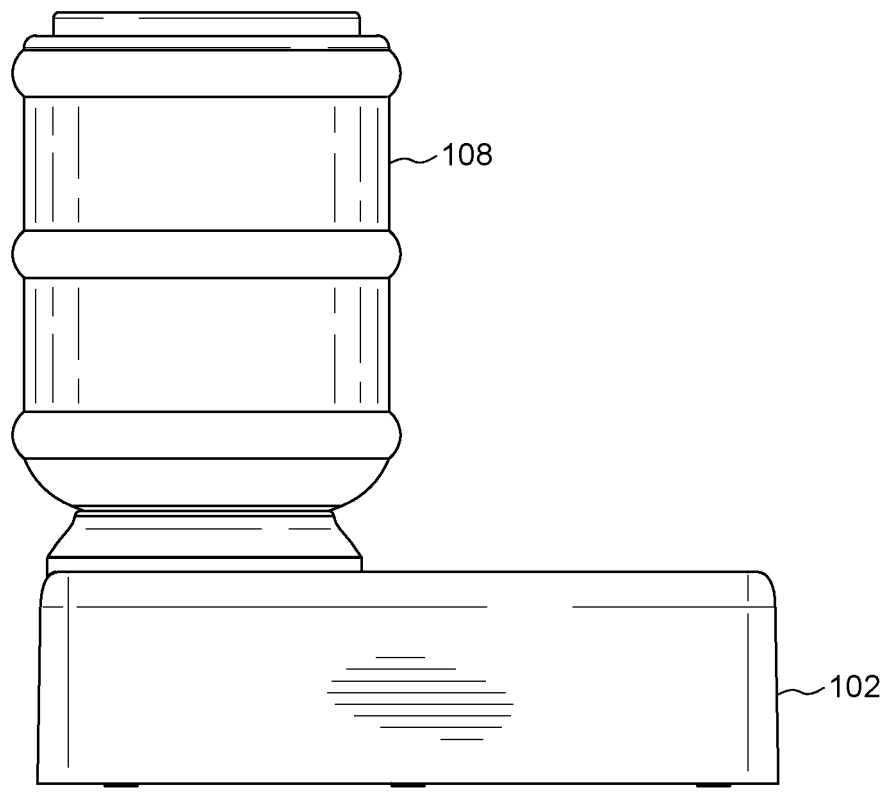
Figure 25:
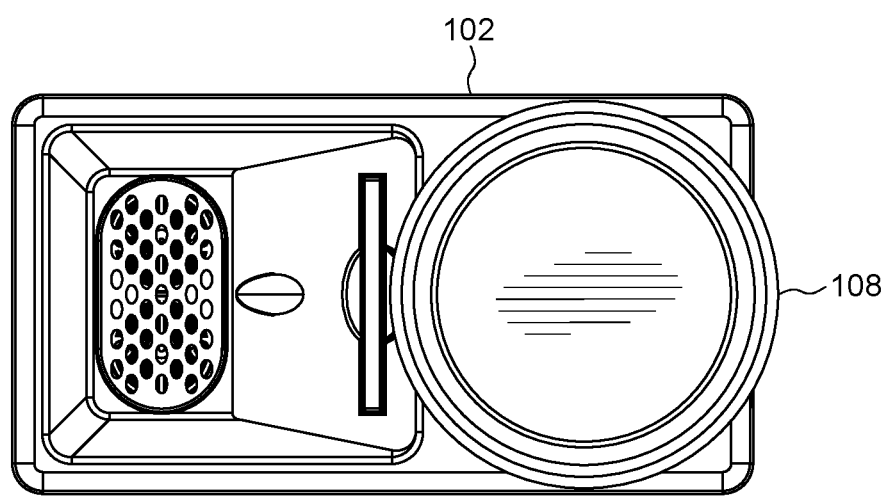
Figure 26:
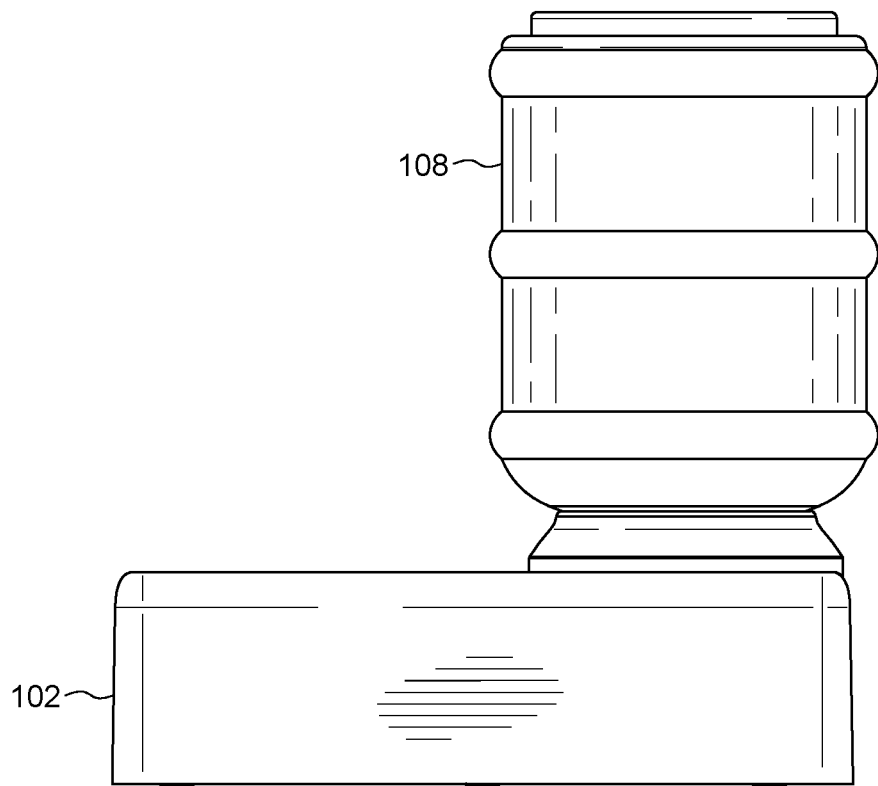
Figure 27:
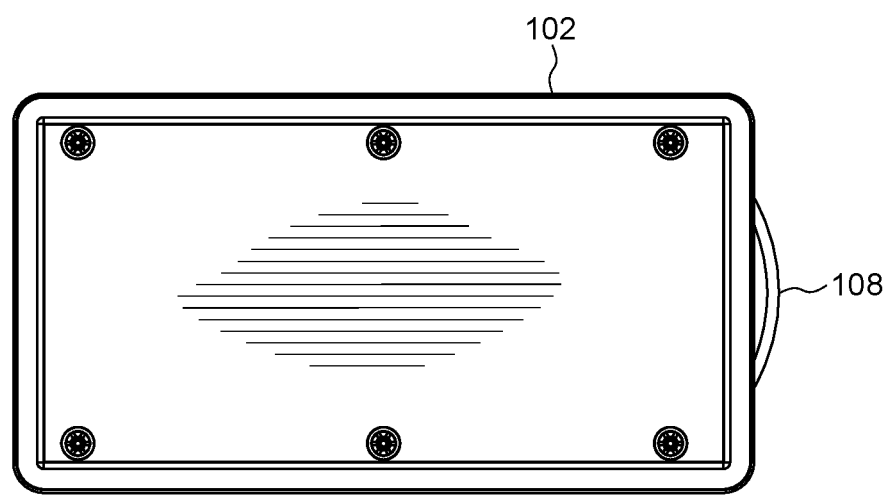
Figure 28:
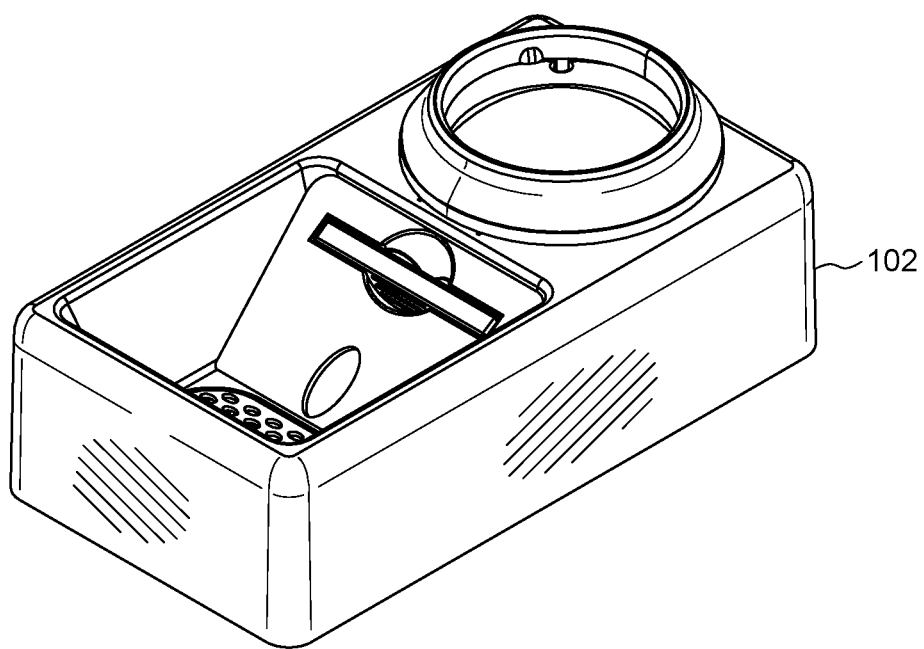
FIGS. 28-34 illustrate views (i.e., a perspective view, a front view, a rear view, a left side view, a top view, a right side view, and a bottom view, respectively) of an ornamental design of a pet hydration system (without the water reservoir), in accordance with an illustrative configuration of the present disclosure.
Figure 29:
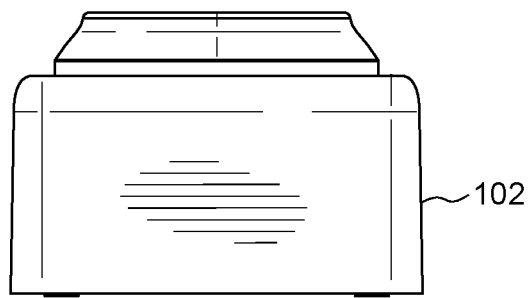
Figure 30:
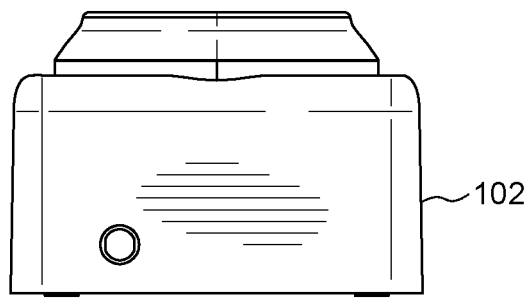
Figure 31:
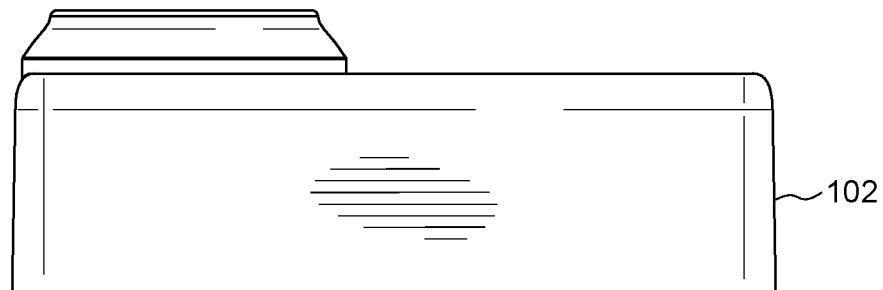
Figure 32:
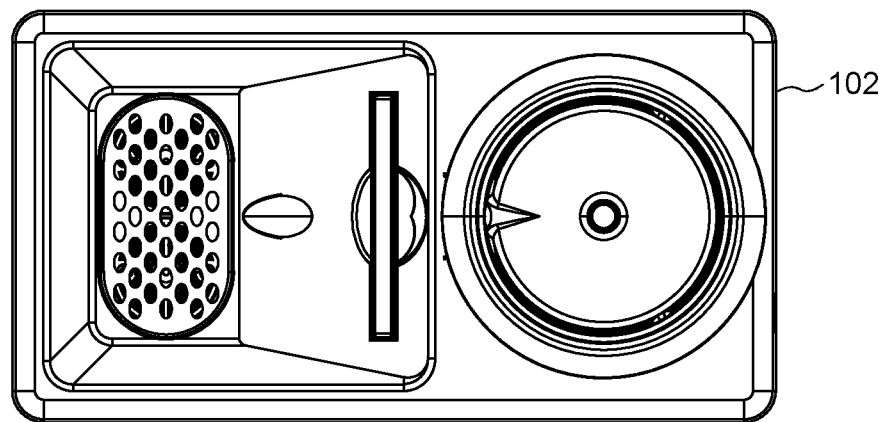
Figure 33:
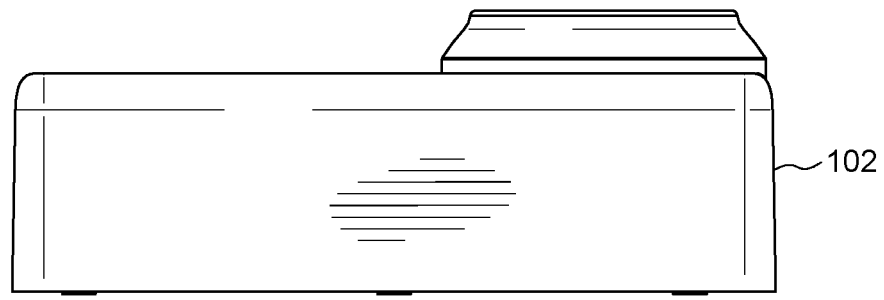
Figure 34:
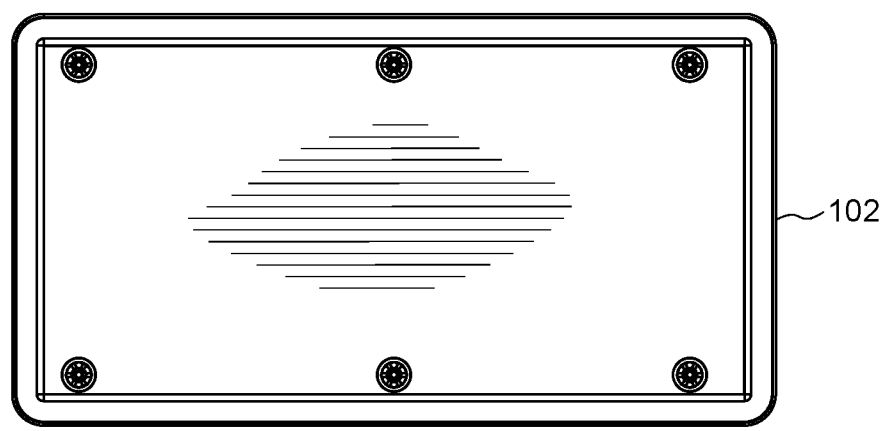
Figure 35:
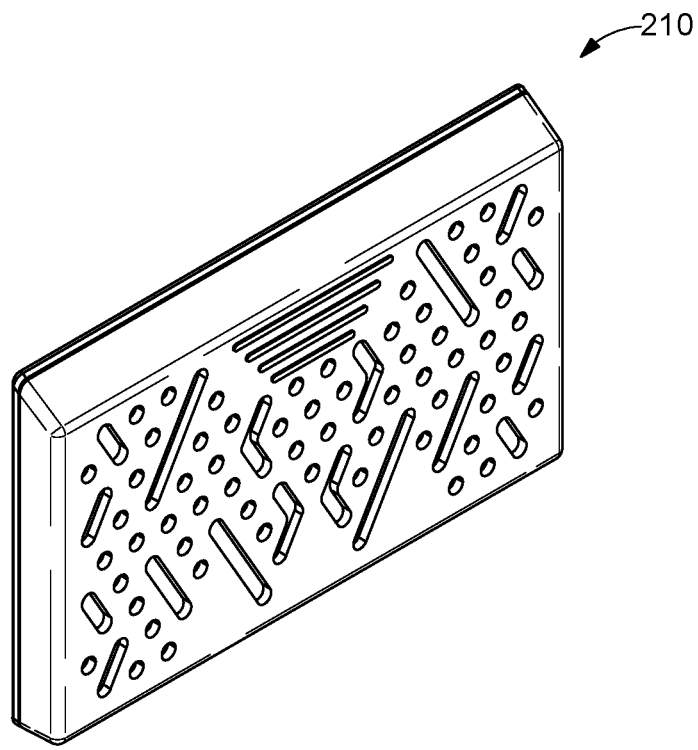
Figure 36:
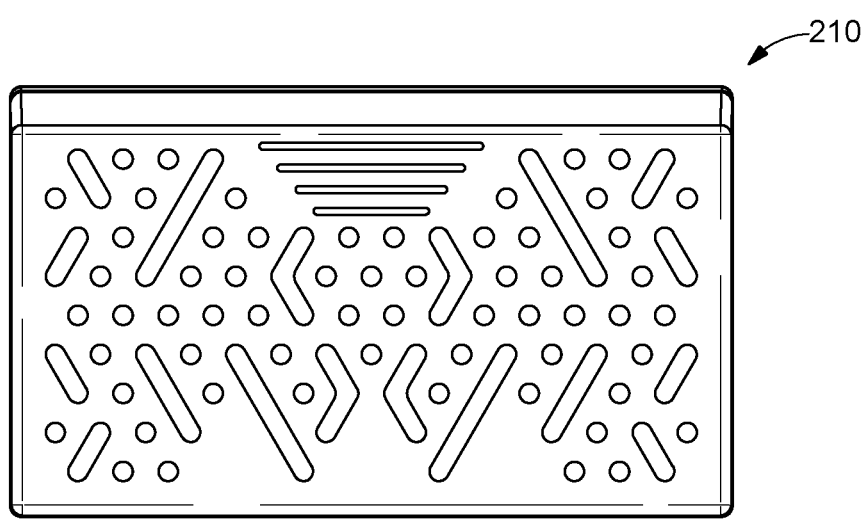

With reference to FIG. 20, a sectional side view 2000 of the pet hydration system 102 with the water reservoir 108 and the cap 212 is illustrated, in accordance with an illustrative configuration of the present disclosure. As illustrated in the FIG. 20, the reservoir section 110 may include a protrusion 2002. This protrusion 2002 may engage with the valve member 214 when the water reservoir 108 is positioned on the reservoir section 110, to cause the upward movement of the valve member 214, and thereby reconfigure the cap 212 into open position. As will be understood, the cap 212 and the valve member 214 may prevent spillage of water from the water reservoir 108 during the process of positioning the water reservoir 108 on the reservoir section 110. Once the cap 212 is configured in the open position, the water released from the water reservoir 108 may be let to flow through the cut-out regions 1606 into the bowl section 106.

Referring now to FIGS. 21-27, views (i.e., a perspective view, a front view, a rear view, a left side view, a top view, a right side view, and a bottom view, respectively) of an ornamental design of the pet hydration system 102 fitted with the water reservoir 108 are illustrated, in accordance with an illustrative configuration of the present disclosure.

Referring now to FIGS. 28-34, views (i.e., a perspective view, a front view, a rear view, a left side view, a top view, a right side view, and a bottom view, respectively) of an ornamental design of the pet hydration system 102 (without the water reservoir 108) are illustrated, in accordance with an illustrative configuration of the present disclosure.

Referring now to FIGS. 35-42, views (i.e., a perspective view, a front view, a rear view, a top view, a bottom view, a right side view, a left side view, and a sectional right side view) of an ornamental design of the filter cartridge 210 of the pet hydration system 102 are illustrated, in accordance with an illustrative configuration of the present disclosure.

Figure 43:
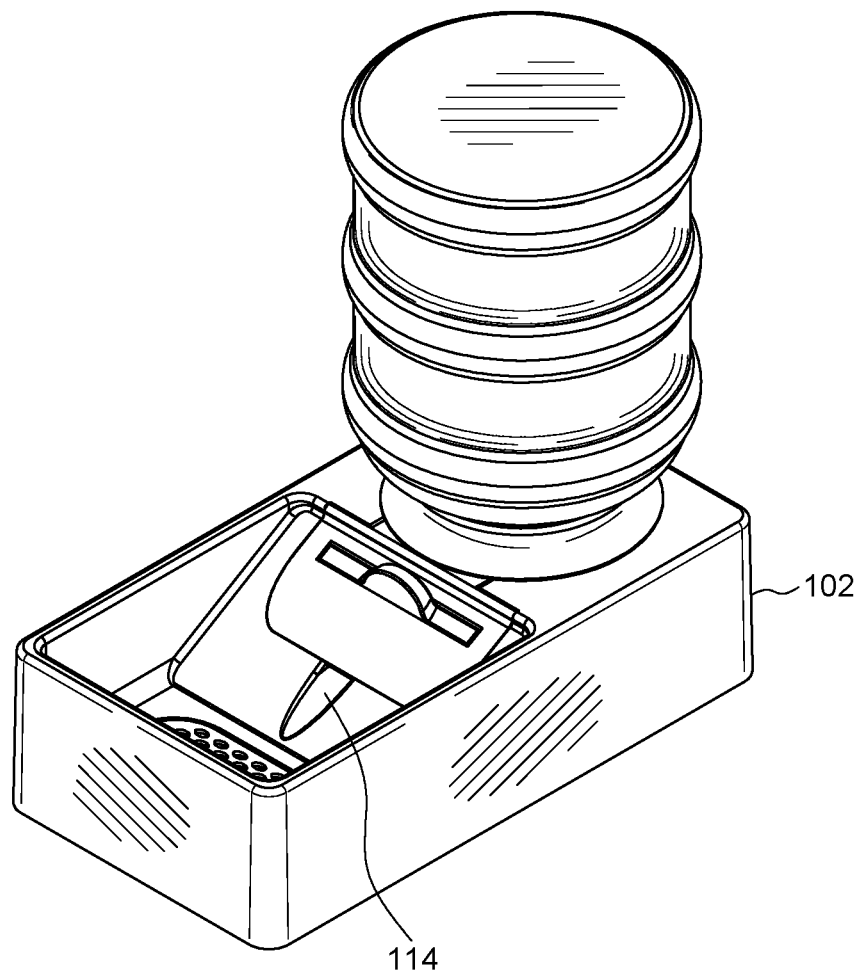
FIG. 43 illustrates a perspective view of a pet hydration system with another configuration of the channel.
Figure 44:
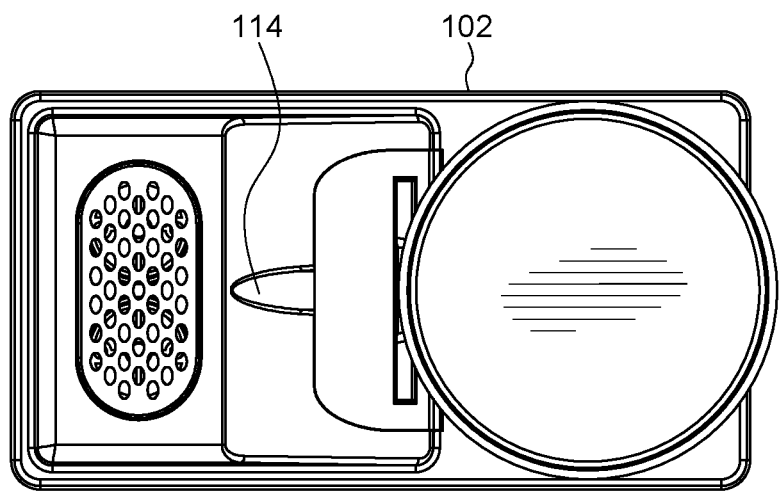
FIG. 44 illustrates a top view of the pet hydration system with the another configuration of the channel.

Referring now to FIGS. 43-44, views (i.e., a perspective view and a top view) of an ornamental design of the pet hydration system 102 with another configuration of the channel 114 are illustrated, in accordance with an illustrative configuration of the present disclosure.

Figure 45:
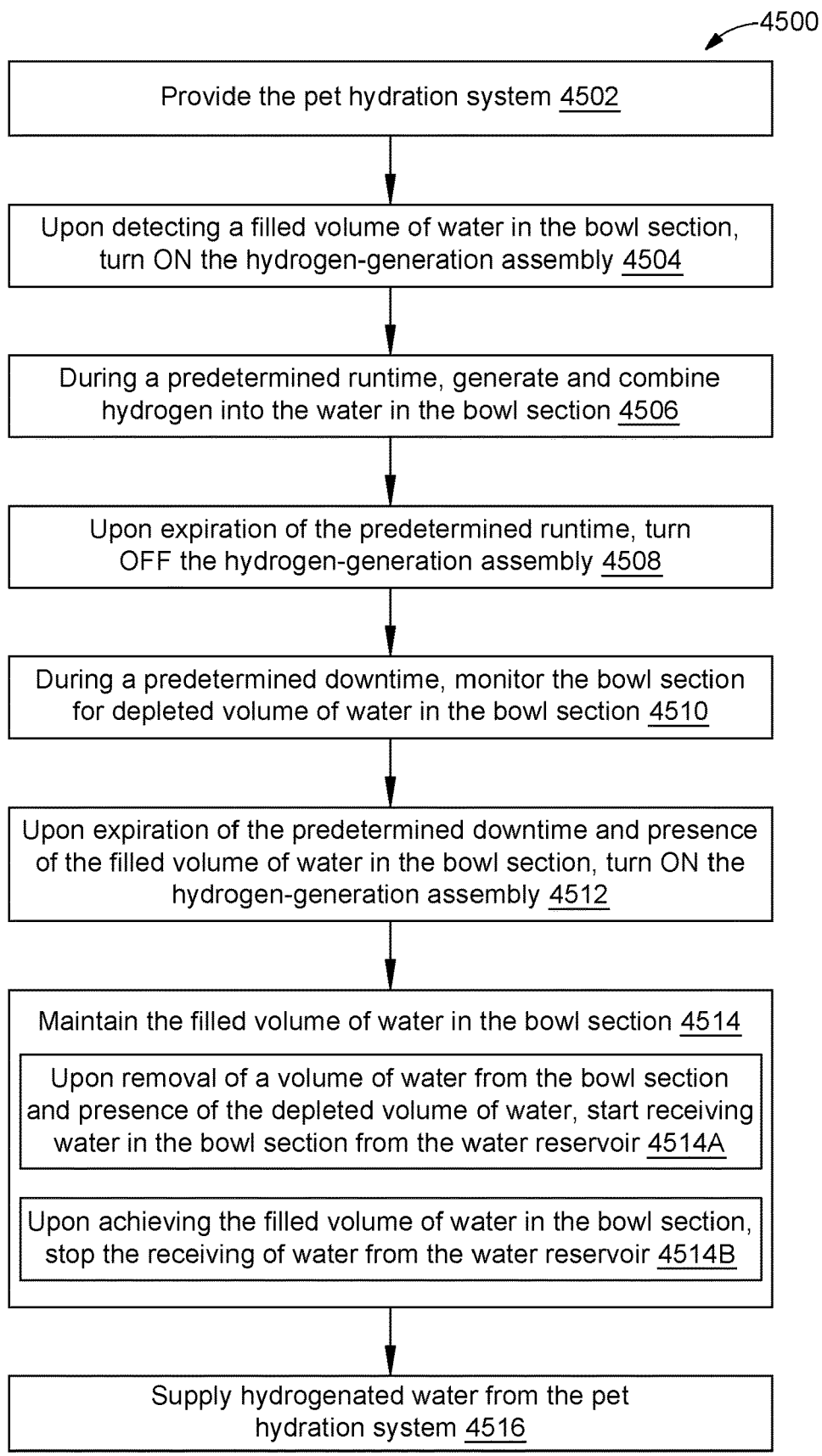
FIG. 45 is a flowchart of a method of managing water supply in the pet hydration system, in accordance with a configuration of the present disclosure.

Referring now to FIG. 45, a flowchart of a method 4500 of managing water supply in the pet hydration system 102 is illustrated, in accordance with a configuration of the present disclosure.

At step 4502, the pet hydration system 102 may be provided. The pet hydration system 102 may include the tray 104 which may further include the bowl section 106 configured to temporarily store water. The bowl section 106 may include the hydrogen-generation assembly 202 positioned at a base of the bowl section 106. The hydrogen-generation assembly 202 may be configured to generate and combine hydrogen into the water in the bowl section 106. The bowl section 106 may selectively contain a filled volume of water in the bowl section 106, or a depleted volume of water that is less than the filled volume of water in the bowl section 106. The pet hydration system 102 may further include the water reservoir 108 controllingly and fluidically coupled to the bowl section 106.

At step 4504, upon detecting the filled volume of water in the bowl section 106, the hydrogen-generation assembly of the set of the set of hydrogen-generation assemblies 202 may be turned ON. It may be noted that this first predetermined volume of water may be detected by the water level sensor 218. The water level sensor 218 may operate on the principle of Infra-Red radiation, or LASER radiation, or any other principle of water level detection known in the art. Upon turning ON, each of the set of hydrogen-generation assemblies 202 may start receiving electrical supply so as to perform electrolysis. The hydrogen-generation assemblies 202 may be electrically and communicatively coupled to the circuit board 216. The circuit board 216 may further be electrically coupled to the electricity source, for example, a battery. As such, at step 4504, the circuit board 216 may start supplying electrical supply each of the set of hydrogen-generation assemblies 202. The circuit board 216 may turn ON the set of hydrogen-generation assemblies 202 based on the level of water in the bowl section 106 as detected by the water level sensor 218. It may be noted that the set of hydrogen-generation assemblies 202 may not be turned ON until a filled volume of water in the bowl section 106. Therefore, upon turning ON of each of the set of hydrogen-generation assemblies 202, each of the set of hydrogen-generation assemblies 202 may start generating and introducing hydrogen gas into the water in the bowl section 106. As mentioned earlier, once the set of hydrogen-generation assemblies 202 may be configured to cause electrolysis of water stored in the bowl section 106 to generate hydrogen gas. Upon turning ON the hydrogen-generation assembly 202, a voltage differential may be created between the anode plate 1002 and the cathode plate 1004. It may be noted that the during hydrogen generation, hydrogen gas bubbles may be produced.

At step 4506, during a predetermined runtime, hydrogen may be generated and combined into the water in the bowl section 106. At step 4508, upon expiration of the predetermined runtime, the hydrogen-generation assembly 202 may be turned OFF. The hydrogen-generation assembly 202 may be turned OFF, based on lapsing of the predetermined runtime after turning ON of the hydrogen-generation assembly. For example, the predetermined runtime may be 15 minutes. In other words, the set of hydrogen-generation assemblies 202 may be automatically turned OFF after every 15 minutes of being turned ON. Alternately, the predetermined runtime may be 5 minutes. Alternately, the hydrogen-generation assembly 202 may be turned OFF based on detecting the depleted volume of water in the bowl section, or upon detecting a level of hydrogen concentration in the water in the bowl section being equal to a threshold hydrogen concentration value. To this end, the pet hydration system 102 may include a hydrogen gas sensor configured to detect the level of hydrogen gas in the water in the bowl section 106. The hydrogen gas sensor may be communicatively coupled to the circuit board 216. Once the level of hydrogen concentration in the water in the bowl section 106 is detected to be equal to the depleted level, the circuit board 216 may turn OFF the set of hydrogen-generation assemblies 202.

At step 4510, during a predetermined downtime, the bowl section 106 may be monitored for the depleted volume of water in the bowl section 106. The depleted volume may be indicative of the volume of water in the bowl section falling below the filled volume of water. Upon detecting the depleted volume, OFF the hydrogen-generation assembly 202 may be turned OFF. Further, a sound source may be turned ON, and a red-color Light Emitting Diode (LED) may be turned ON.

At step 4512, upon expiration of the predetermined downtime and presence of the filled volume of water in the bowl section 106, the hydrogen-generation assembly 202 may be turned ON. The hydrogen-generation assembly 202 may be turned ON based on upon lapsing of the predetermined downtime after turning OFF the hydrogen-generation assembly, or upon detecting a level of hydrogen concentration in the water in the bowl section being below a threshold hydrogen concentration value. At step 4514, the filled volume of water may be maintained in the bowl section 106. In order to maintain the filled volume of water in the bowl section 106, steps 4514A and 4514B may be performed. At step 4514A, upon removal of a volume of water from the bowl section 106 and presence of the depleted volume of water, the bowl section 106 may start receiving water from the water reservoir 108. At step 4514B, upon achieving the filled volume of water in the bowl section 106, the receiving of water from the water reservoir 108 may be stopped. It may be noted that the pet hydration system 102 is so configured that the water reservoir 108 may be used to maintain the filled volume of water in the bowl section 106. When the bowl section 106 fills up, water outlet (i.e. cut-out regions 1606) from the water reservoir 108 may be closed by the water. When the water level in the bowl section 106 drops, the outlet maybe exposed and water runs from the water reservoir 108 to the bowl section 106, until the outlet is closed. At a result, at step 4516, hydrogenated water may be supplied from the pet hydration system 102.

In some configurations, providing the pet hydration system may further include providing the illumination source 224 configured to emit light via a light path to accentuate generation of hydrogen the hydrogen-generation assembly 202. Further, upon turning ON the hydrogen-generation assembly 202, the illumination source 224 may be turned ON to illuminate bubbles formed in the water in the bowl section 106 during hydrogen generation.

Figure 46:
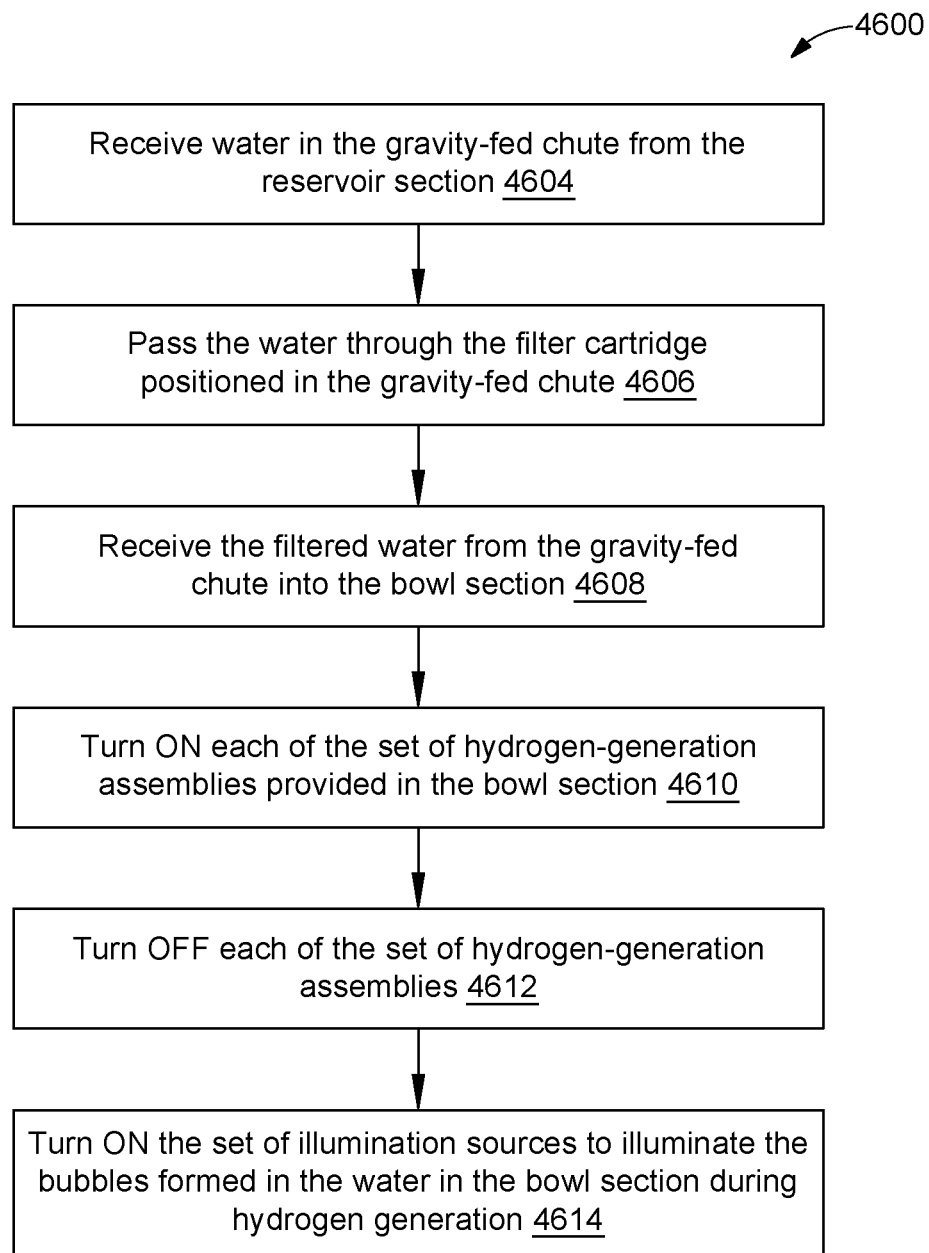
FIG. 46 is a flowchart of a method of treating water in a pet hydration system, in accordance with a configuration of the present disclosure.

Referring now to FIG. 46, a flowchart 4600 of a method 4602 of treating water in the pet hydration system 102 is illustrated, in accordance with a configuration of the present disclosure. At step 4604, water may be received in the gravity-fed chute 1402 from the reservoir section 110. As mentioned earlier, the reservoir section 110 and the gravity-fed chute 1402 are defined in the tray 104 of the pet hydration system 102. Further, the reservoir section 110 may be configured to dynamically supply water to the bowl section 106 defined in the tray 104, in response to water being removed from the bowl section 106.

At step 4606, the water may be passed through the filter cartridge 210 positioned in the gravity-fed chute 1402. The filter cartridge 210 may be configured to filter the water flowing from the reservoir section 110 towards the bowl section 106 and passing through the filter cartridge 210. At step 4608, the filtered water from the gravity-fed chute 1402 may be received in to the bowl section 106. At step 4610, each of the set of hydrogen-generation assemblies 202 provided in the bowl section 106 may be turned ON. This is already explained in conjunction with the method 4500.

At step 4612, each of the set of hydrogen-generation assemblies 202 may be turned OFF. In one configuration, the set of hydrogen-generation assemblies 202 may be turned OFF upon lapsing of a predetermined period of time after turning ON of each of the set of hydrogen-generation assemblies 202. In an alternate configuration, each of the set of hydrogen-generation assemblies 202 may be turned OFF upon detecting a level of hydrogen concentration in the water in the bowl section 106 being equal to a threshold hydrogen concentration value. Further, alternately, each of the set of hydrogen-generation assemblies 202 may be turned OFF upon detecting a level of hydrogen concentration in the water in the bowl section 106 being equal to a threshold hydrogen concentration value. In another alternate configuration, each of the set of hydrogen-generation assemblies 202 may be turned OFF upon detecting the volume of water in the bowl section 106 lowering below the filled volume of water. At step 4614, the set of illumination sources 224 may be turned ON to illuminate the bubbles formed in the water in the bowl section 106 during hydrogen generation.

Figure 47:
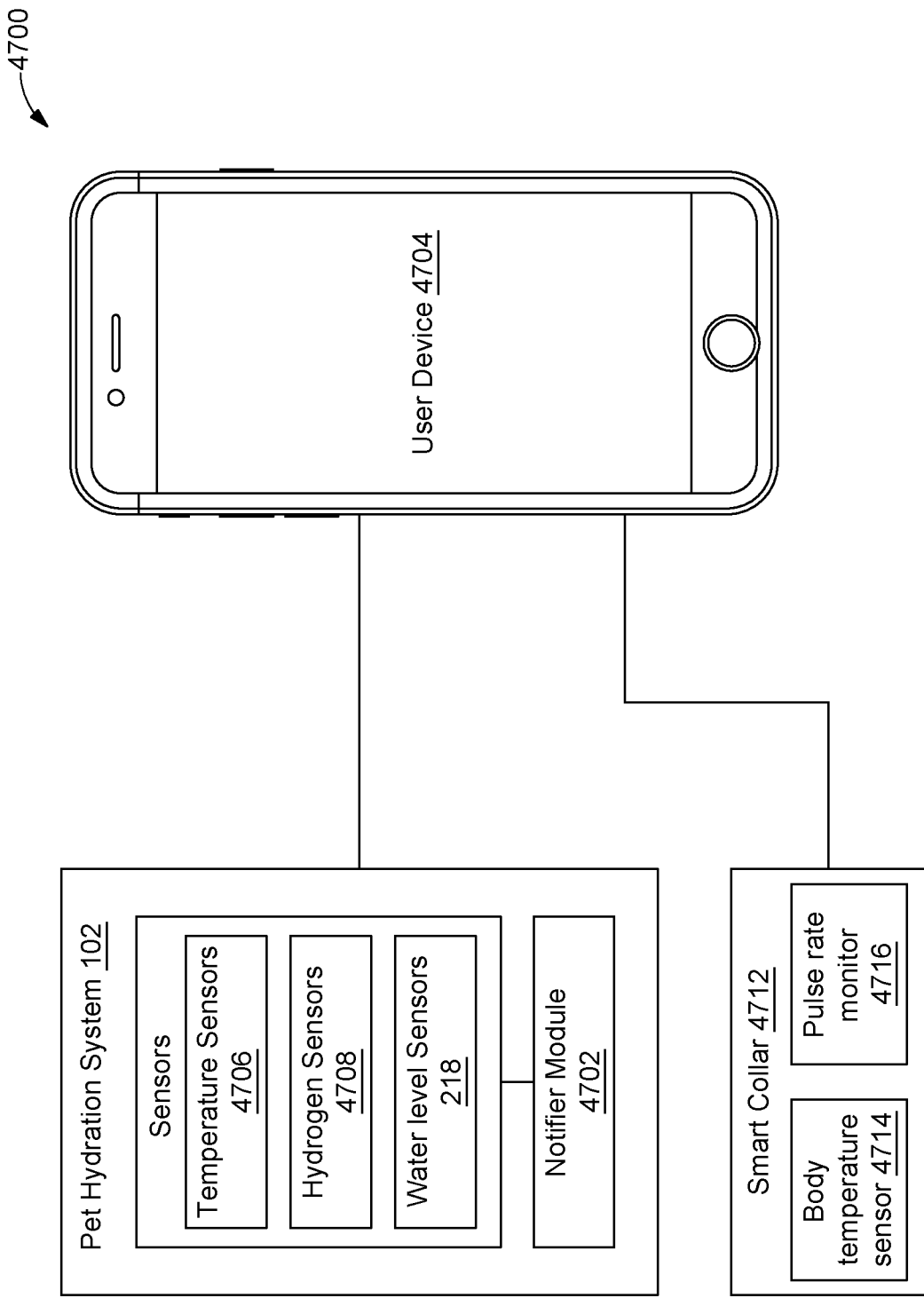
FIG. 47 illustrates an environment including a pet hydration system coupled with a user device, in accordance with a configuration of the present disclosure.

Referring now to FIG. 47, an environment 4700 is illustrated. As illustrated, in some configurations, the pet hydration system 102 may be configured with a notifier module 4702. To this end, in some configurations, the pet hydration system 102 may be configured to directly communicate with a cellular network, or to communicate with an edge device (e.g., a router) located in the surroundings of the pet hydration system 102. In such configurations, the edge device may further couple the pet hydration system 102 with a user device 4704 (also, referred to as mobile device), for example, an Internet-of-Things device, a computer, a mobile phone, a tablet, etc. To this end, a modem may be configured in the user device 4704 to enable the user device 4704 to communicate with the pet hydration system 102 or the edge device. Further, the user device 4704 may be configured with a notifier. The user device 4704 may notify the user about the condition associated with the pet hydration system 102.

The pet hydration system 102 may further include one or more sensors, for example, a temperature sensor 4706 formed in the bowl section 106, a hydrogen sensor 4708 formed in the bowl section 106, and the water level sensor 218 formed in the bowl section 106. The temperature sensor 4706 may be configured to sense the temperature of the water stored in the bowl section 106. The hydrogen sensor 4708 may be configured to sense the amount of hydrogen in the water stored in the bowl section 106. As already explained above, the water level sensor 218 may be configured to sense the level of water in the bowl section 106. The notifier module 4702 of the pet hydration system 102 may be configured to communicate with the temperature sensor 4706, the hydrogen sensor 4708, and the water level sensor 218, and accordingly signal presence of at least one predetermined event. For example, the event may include a temperature rule violation, or a hydrogen level violation, or a water level violation. As will be understood, the temperature rule violation may correspond to the temperature of water (as sensed by the temperature sensor 4706) being outside a predetermined range of desirable temperature of the water meant for pet's consumption (i.e. too hot or too cold for the pet). The hydrogen level violation may correspond to the level of hydrogen (as sensed by the hydrogen sensor 4708) being outside a predetermined range of desirable hydrogen level in the water (i.e. too little or too much hydrogen as per pet's requirement). The water level violation may correspond to level of water in the bowl section 106 (as sensed by the water level sensor 218) lying outside a predetermined range of level of water (for example, depleted level of water).

Figure 48:
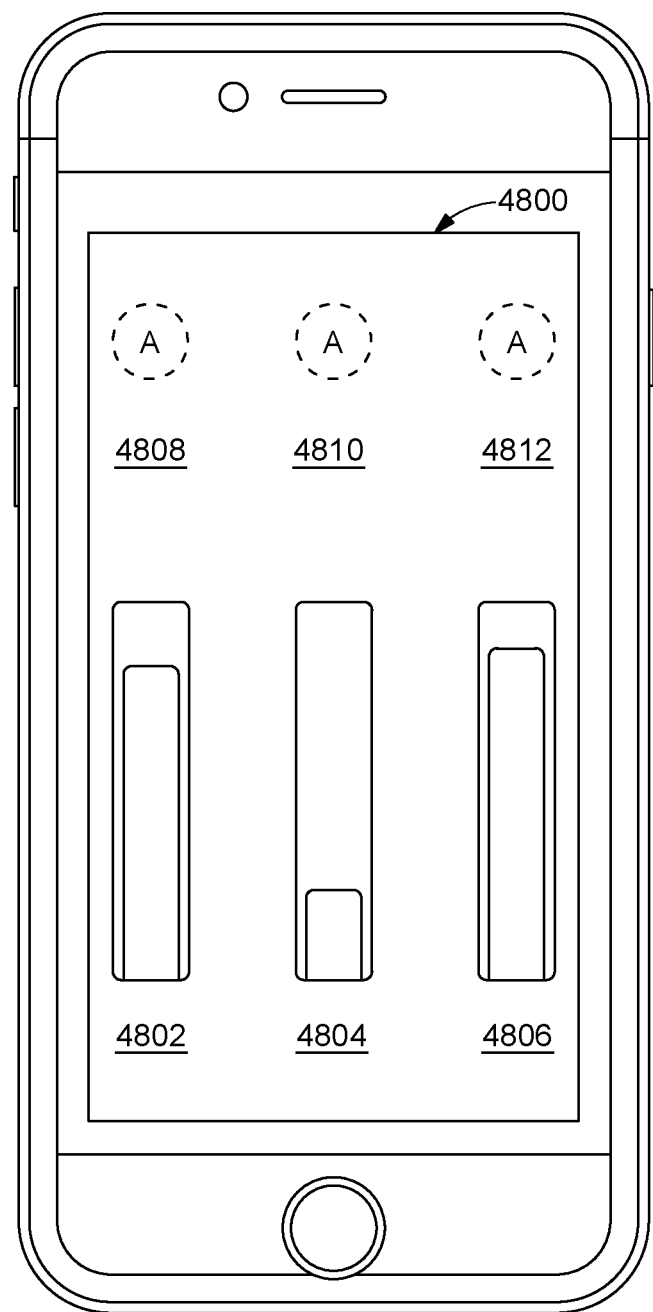
FIG. 48 illustrates an example application screen of a notification application, in accordance with some configurations of the present disclosure.

The notifier module 4702 may, therefore, generate a notification to notify the user, via the user device 4704. The notification may be provided to the user, via a notification application installed on the user device 4704. With reference to FIG. 48, an example application screen 4800 of the notification application is illustrated, in accordance with some configurations of the present disclosure. As illustrated in the FIG. 48, the application screen 4800 may include a water level icon 4802, a water temperature icon 4804, and a hydrogen level icon 4806. Further, the application screen 4800 may display one or more alert icons. The one or more alert icons may include a feeding time alert icon 4808, a water empty alert icon 4810, and a veterinarian ('Vet') alert icon 4812. As will be understood, the feeding time alert icon 4808 may provide an alert when it is time for feeding the pet. The water empty alert icon 4810 may provide an alert about when the level of water in the bowl section 106 is low. The Vet alert icon 4812 may provide an alert about a periodic visit to a veterinary doctor which is due, or when the pet is in requirement of the medical support.

In order to determine whether there is requirement of medical support, health parameters of the pet may be obtained. For example, the health parameters of pet's body temperature and pet's pulse rate may be obtained from a smart collar worn by the pet (for example, around the neck of the pet). Referring back to FIG. 47, a smart collar 4712 may be configured with a body temperature sensor 4714 and a pulse rate monitor 4716 to obtain the health parameters.

Specific details are given in the above description to provide a thorough understanding of the configurations. However, it is understood that the configurations may be practiced without these specific details. For example, circuits may be shown in block diagrams in order not to obscure the configurations in unnecessary detail. In other instances, well-known circuits, processes, algorithms, structures, and techniques may be shown without unnecessary detail in order to avoid obscuring the configurations.

Also, it is noted that the configurations may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

In the configurations described above, for the purposes of illustration, processes may have been described in a particular order. It should be appreciated that in alternate configurations, the methods may be performed in a different order than that described. It should also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

While illustrative and presently preferred configurations of the disclosed systems, methods, and/or machine-readable media have been described in detail herein, it is to be understood that the inventive concepts may be otherwise variously embodied and employed, and that the appended claims are intended to be construed to include such variations, except as limited by the prior art. While the principles of the disclosure have been described above in connection with specific apparatuses and methods, it is to be clearly understood that this description is made only by way of example and not as limitation on the scope of the disclosure.

What is claimed is:

1. A pet hydration system comprising:
    a reservoir configured to supply water;
    a gravity-fed chute fluidically coupled with the reservoir, the gravity-fed chute defining a first cross-sectional area;
    a bowl fluidically coupled to the reservoir by the gravity-fed chute;
    an enlarged area formed in the gravity-fed chute between the reservoir and the bowl, the enlarged area defining:
        a second cross-sectional area that is greater than the first cross-sectional area; and
        a cartridge slot formed in the enlarged area; and
    a filter cartridge removably adjoining the enlarged area and slidingly engaged with the cartridge slot, wherein water communicates from the reservoir through the filter cartridge and into the bowl.

2. The pet hydration system of claim 1, further comprising:
    a first bottom within the reservoir;
    a second bottom within the enlarged area, wherein the second bottom is at a lower elevation than the first bottom; and
    a third bottom within the bowl, wherein the third bottom is located at a lower elevation than the first bottom and the third bottom is located at an elevation above the second bottom.

3. The pet hydration system of claim 1 and further comprising:
    a slanted base adjoining the reservoir and adjoining the enlarged area.

4. The pet hydration system of claim 3, wherein the slanted base is angled 10 to 80 degrees relative to a horizontal surface of the reservoir.

5. The pet hydration system of claim 1, the bowl comprising:
    a first planar surface adjoining the gravity-fed chute;
    a channel formed in the first planar surface adjoining the gravity-fed chute; and
    a second planar surface oppositely disposed from the first planar surface;
    wherein water communicating from the reservoir to the bowl passes through the channel.

6. The pet hydration system of claim 5, the bowl comprising:
    a third planar surface formed adjacent to, both the first planar surface and the second planar surface; and
    a fourth planar surface formed opposite to the third planar surface.

7. The pet hydration system of claim 6, the bowl comprising:
    a frustum structure defining a central axis;
    wherein the first planar surface, the second planar surface, the third planar surface, and the fourth planar surface are transverse to the central axis.

8. The pet hydration system of claim 1, the bowl comprising:
    a water level sensor configured to measure a level of water temporarily stored in the bowl.

9. The pet hydration system of claim 1, the bowl comprising:
    a hydrogen generation assembly;
    wherein the hydrogen generation assembly is configured to generate and combine hydrogen into the water stored in the bowl.

10. The pet hydration system of claim 9, wherein the hydrogen generation assembly further comprises:
    a cathode plate;
    an anode plate parallel to and offset from the cathode plate; and
    a spacer positioned between the cathode plate and the anode plate.

11. The pet hydration system of claim 10, wherein the hydrogen generation assembly comprising:
    a hole formed in a center of the cathode plate;
    a hole formed in a center of the anode plate; and
    a hole formed in a center of the spacer;
    wherein the holes, the hole in the cathode plate, the hole in the anode plate, and the hole in the spacer are co-axial, and concentrically aligned to define a light path.

12. The pet hydration system of claim 11, further comprising:
    an illumination source positioned coaxially to the holes in the cathode plate, the hole in the anode plate, and the hole in the spacer;
    wherein the illumination source is configured to illuminate hydrogen generated by the hydrogen generation assembly along the light path.

13. A method of supplying water from a pet hydration system, the method comprising:
    providing the pet hydration system, the pet hydration system comprising:
        a reservoir configured to supply water;
        a gravity-fed chute fluidically coupled with the reservoir, the gravity-fed chute defining: a first cross-sectional area;

a bowl fluidically coupled to the reservoir by the gravity-fed chute; and an enlarged area formed in the gravity-fed chute between the reservoir and the bowl, the enlarged area defining a second cross-sectional area that is greater than the first cross-sectional area;

positioning a filter cartridge in the gravity-fed chute, adjoining the enlarged area;

receiving water in the gravity-fed chute from the reservoir;

passing the water through the filter cartridge;

wherein the filter cartridge is configured to filter the water received by the gravity-fed chute and passing through the filter cartridge; and receiving by the bowl, water from the filter cartridge.

14. The method of claim 13, further comprising:

providing a hydrogen generation assembly in the bowl;

wherein the hydrogen generation assembly is configured to generate and combine hydrogen into the water stored in the bowl.

15. The method of claim 14, wherein the hydrogen generation assembly comprises:

a cathode plate;

a hole formed in a center of the cathode plate;

an anode plate parallel to and offset from the cathode plate;

a hole formed in a center of the anode plate;

a spacer positioned between the cathode plate and the anode plate; and a hole formed in a center of the spacer;

wherein the hole of the cathode plate, the hole in the anode plate, and the hole in the spacer are co-axial, and concentrically aligned to define a light path; and an illumination source being positioned coaxially to the hole in the cathode plate, the hole in the anode plate, and the hole in the spacer;

wherein the illumination source is configured to illuminate hydrogen generated by the hydrogen generation assembly along the light path.

16. The method of claim 13, wherein the pet hydration system further comprises:

a first bottom within the reservoir;

a second bottom within the enlarged area, wherein the second bottom is at a lower elevation than the first bottom; and a third bottom within the bowl, wherein the third bottom is located at a lower elevation than the first bottom and the third bottom is located at an elevation above the second bottom.

* * * * *